April 18, 1944. D. G. LILLEY 2,346,979
VARIABLE PITCH PROPELLER
Filed Aug. 13, 1940 9 Sheets-Sheet 2
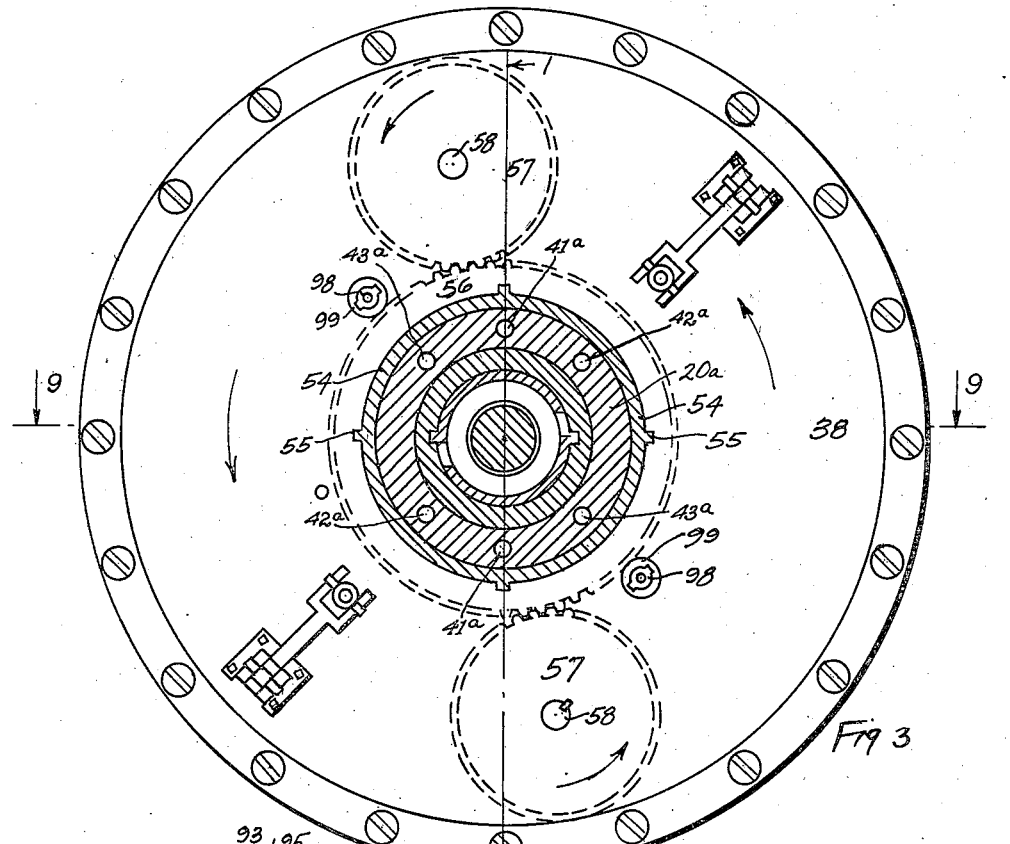
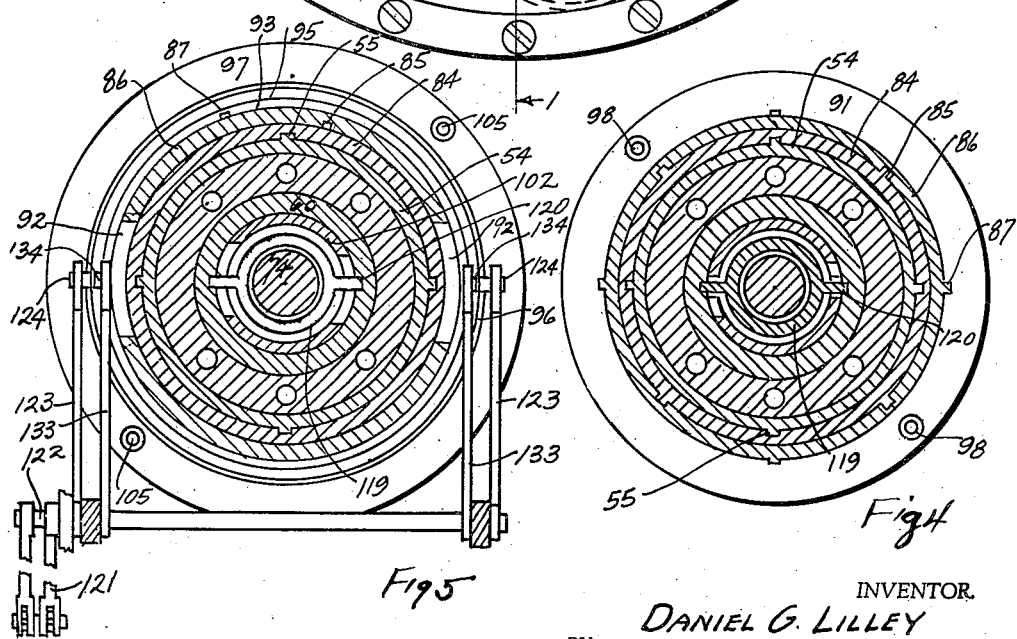
INVENTOR.
DANIEL G. LILLEY
BY 
ATTORNEY.

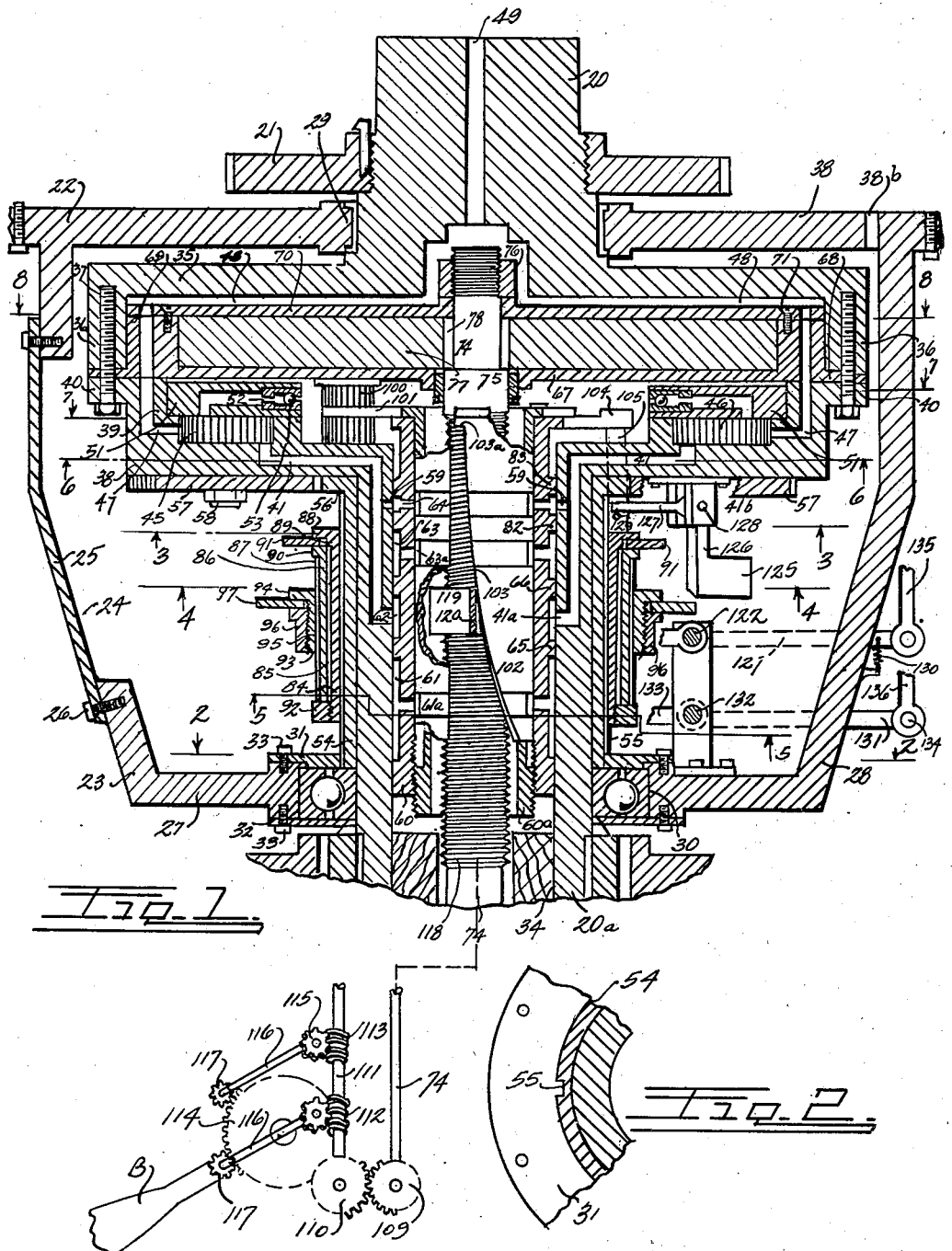

April 18, 1944.  D. G. LILLEY  2,346,979
VARIABLE PITCH PROPELLER
Filed Aug. 13, 1940   9 Sheets-Sheet 3

INVENTOR.
DANIEL G. LILLEY
BY Martin E. Anderson
ATTORNEY.

April 18, 1944. D. G. LILLEY 2,346,979
VARIABLE PITCH PROPELLER
Filed Aug. 13, 1940 9 Sheets-Sheet 4

INVENTOR
DANIEL G. LILLEY
BY Martin E. Anderson
ATTORNEY.

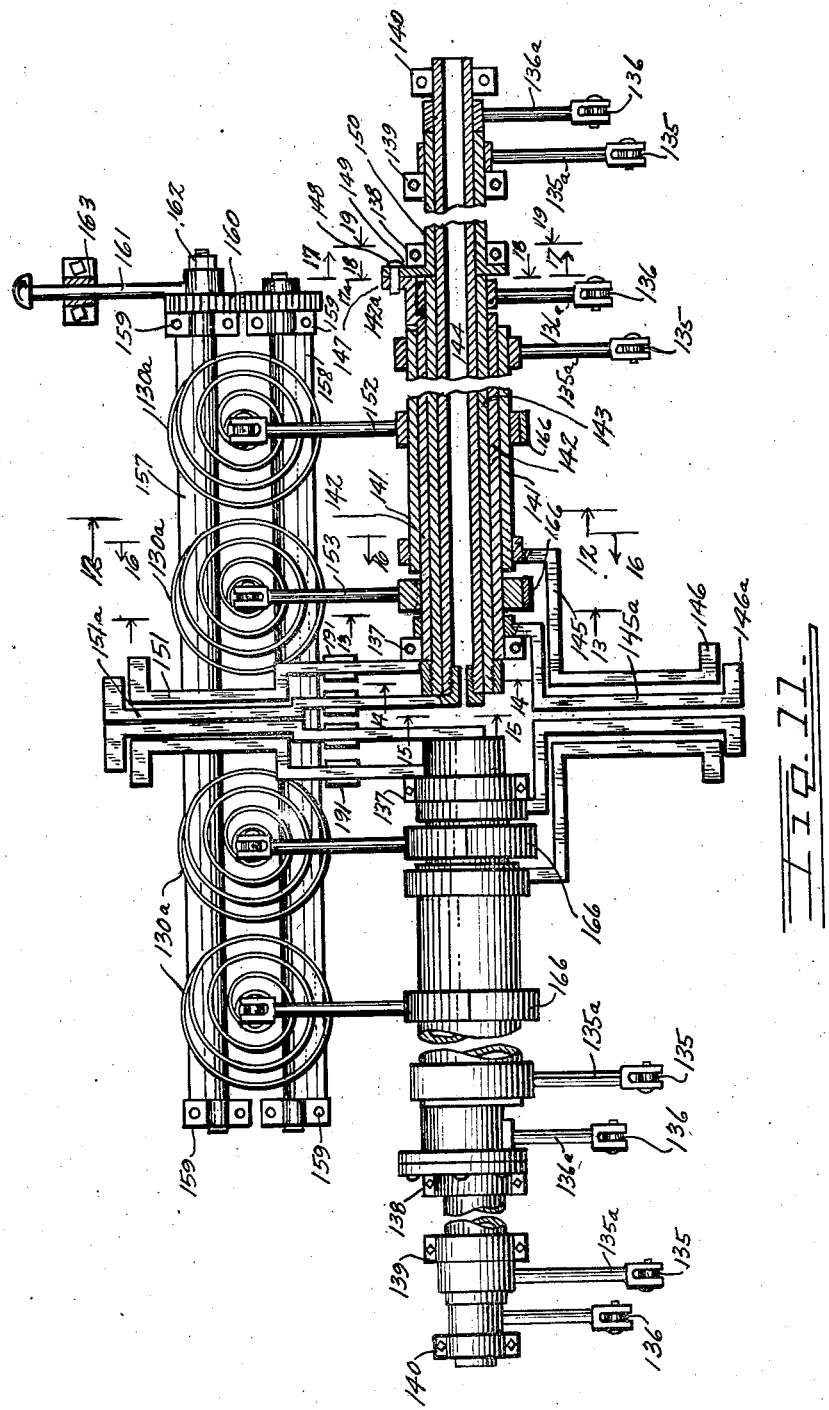

April 18, 1944. D. G. LILLEY 2,346,979
VARIABLE PITCH PROPELLER
Filed Aug. 13, 1940 9 Sheets-Sheet 6
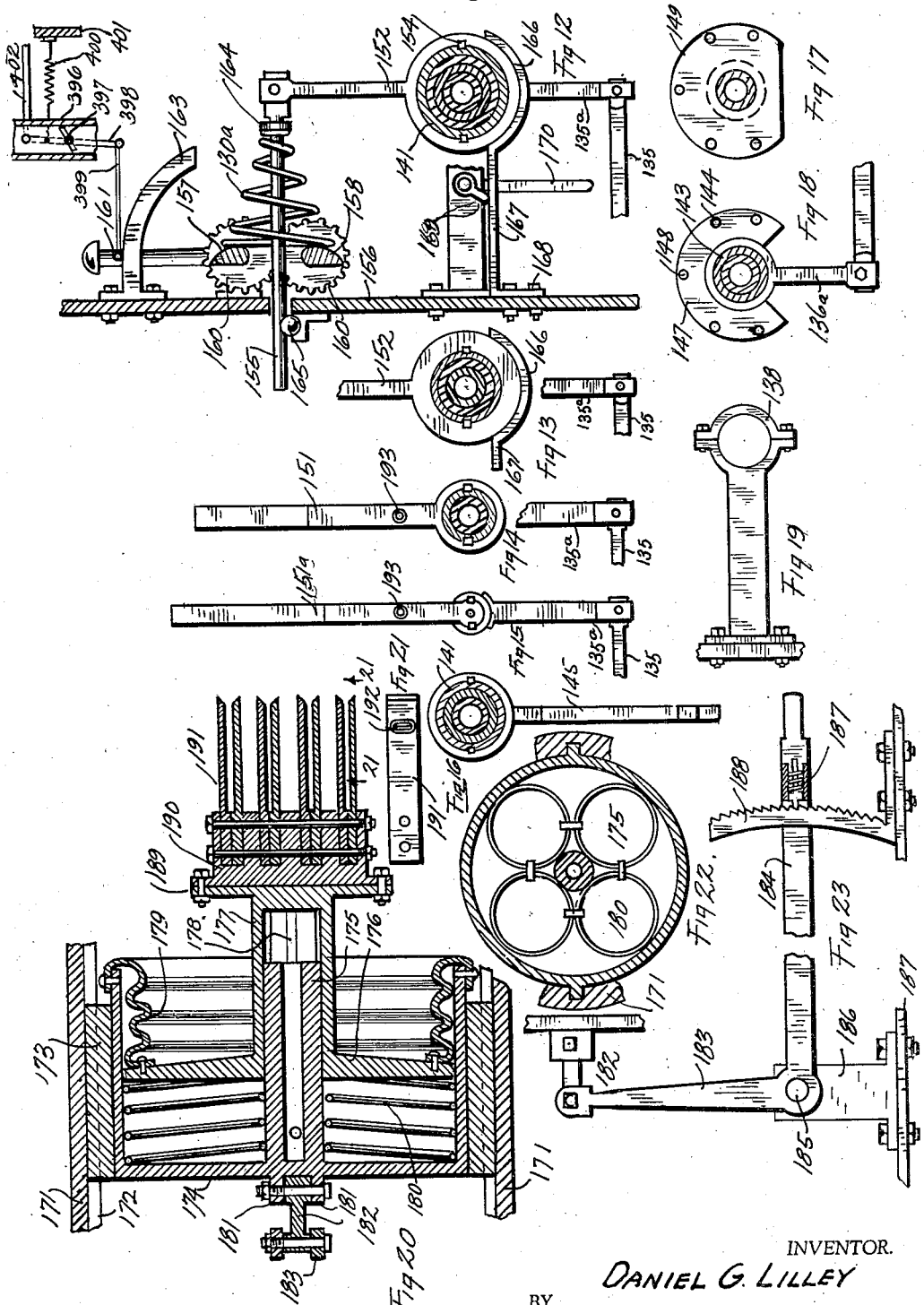
INVENTOR.
DANIEL G. LILLEY
BY Martin E Anderson
ATTORNEY.

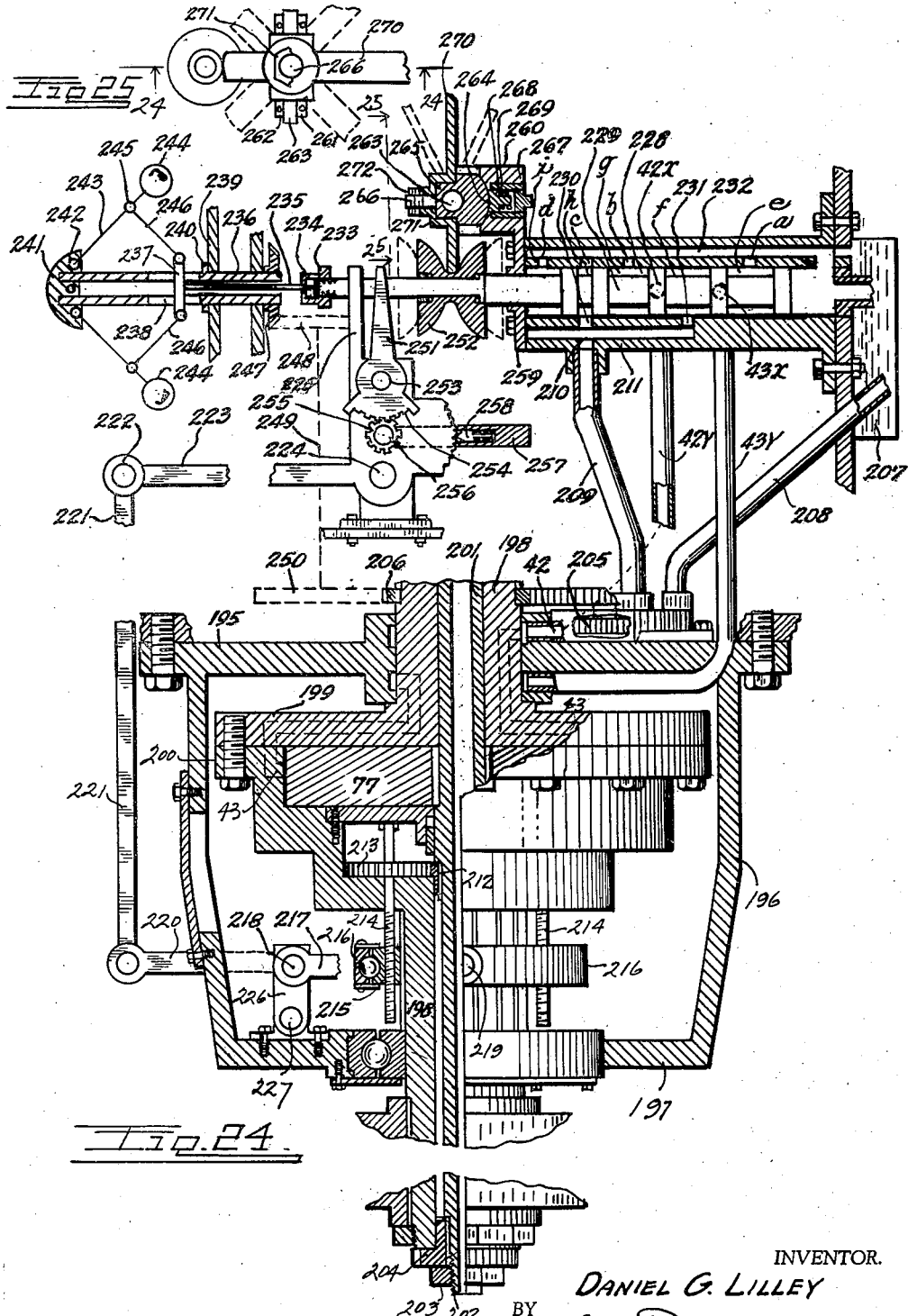

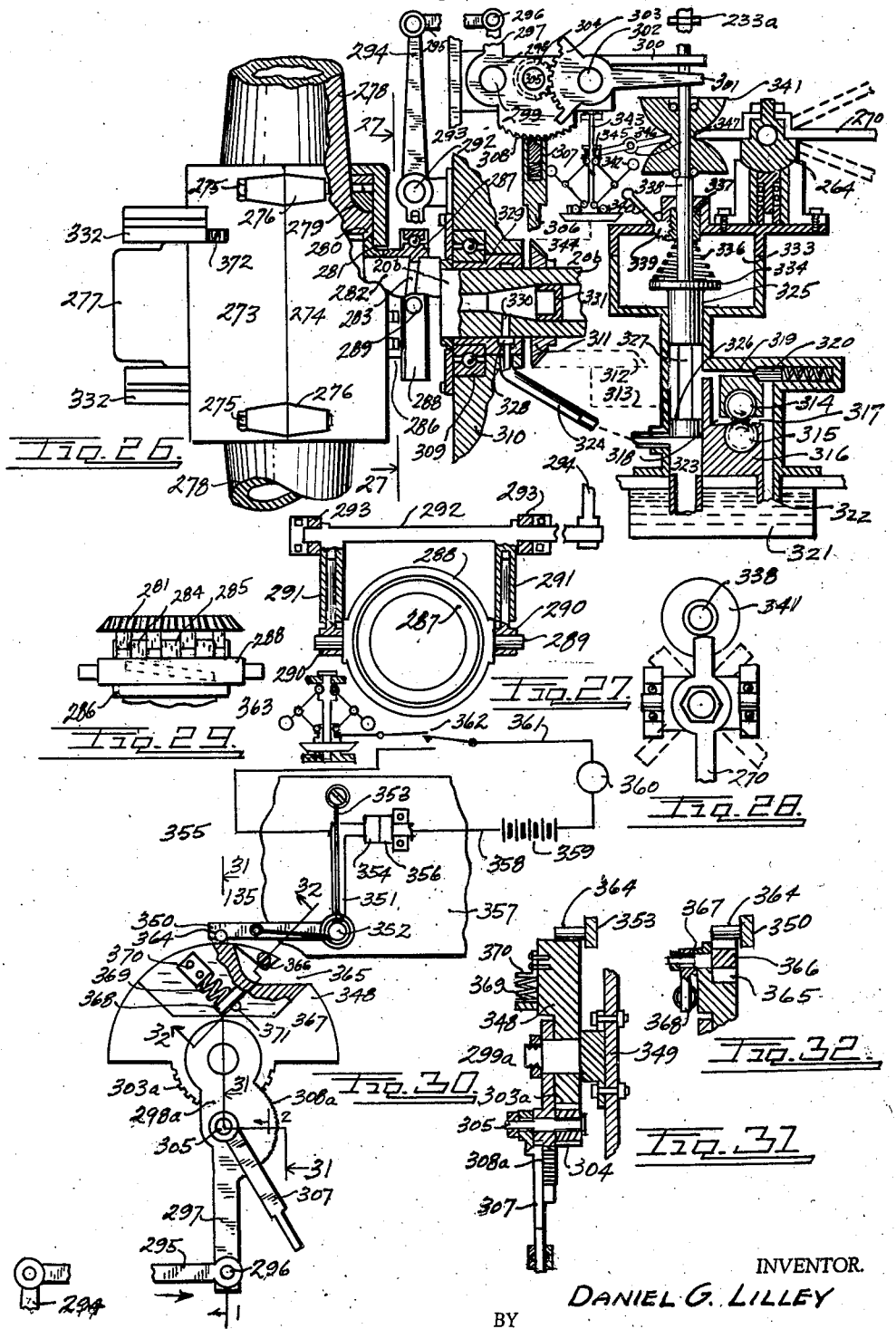

April 18, 1944.    D. G. LILLEY    2,346,979
VARIABLE PITCH PROPELLER
Filed Aug. 13, 1940    9 Sheets-Sheet 9
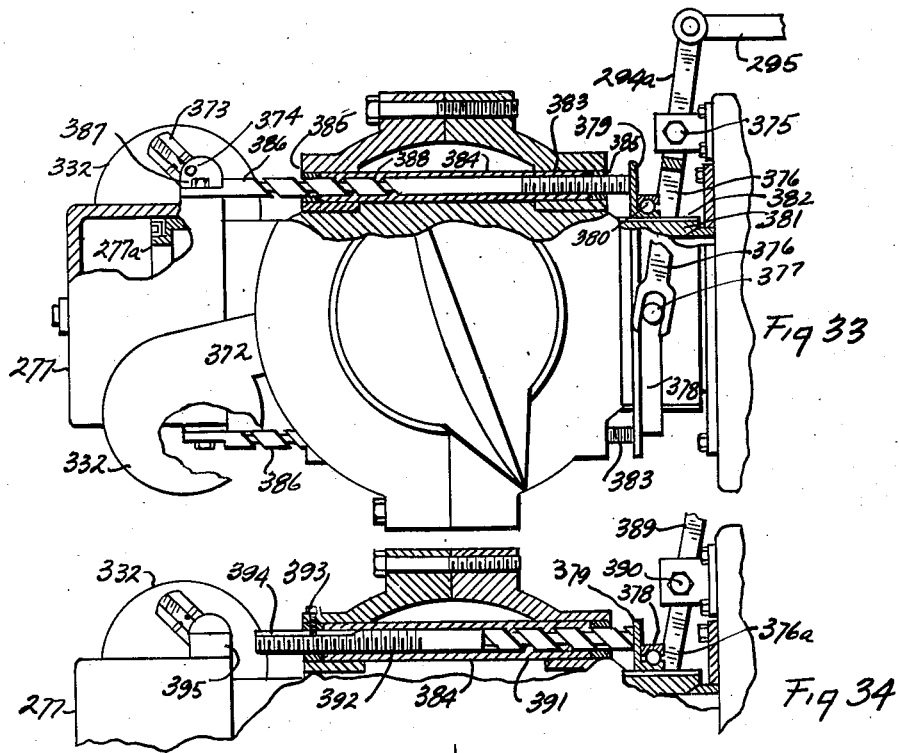
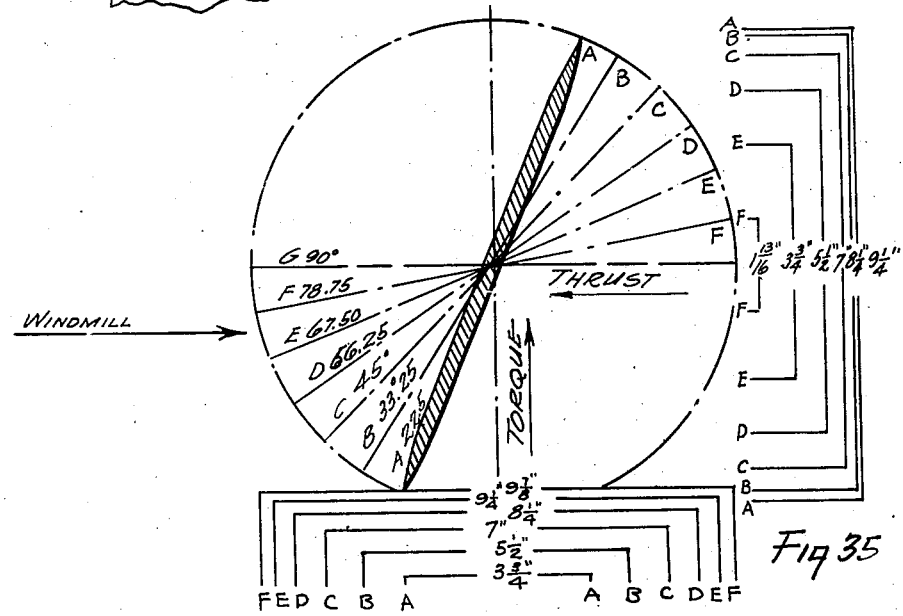
INVENTOR.
DANIEL G. LILLEY
BY Martin E. Anderson
attorney Patented Apr. 18, 1944

2,346,979

UNITED STATES PATENT OFFICE 2,346,979

VARIABLE PITCH PROPELLER

Daniel G. Lilley, Denver, Colo.

Application August 13, 1940, Serial No. 352,352

30 Claims. (Cl. 170—163)

This invention relates to improvements in variable pitch propellers of the type employed in connection with aeroplanes.

It is well understood that for the greatest efficiency of operation, means must be provided for changing the pitch of the propellers so as to get maximum traction while leaving the ground and maximum speed while in the air.

Various types of variable pitch propellers have been invented and shown in various patents heretofore granted.

One of the most important objects of this invention is to provide an automatic variable pitch propeller of the constant speed type which shall be provided with manually adjustable stops for limiting the pitch angle adjustment while the propeller is operating. The importance of such variable stops can best be appreciated from the following description and explanation of the theory and operation which will now be set out for this purpose.

INTRODUCTORY STATEMENT

No matter where wind is encountered, on the ground or in the air, if it blows head on, and substantially parallel to the axis about which a propeller turns, it is windmill action, and as far as propeller thrust efficiency is concerned, it is just so much lost motion.

Where such winds are of any appreciable velocity, they produce a fault in the operation and control of automatic variable pitch propeller mechanisms, and especially so in the governor controlled type. A similar fault is brought about by the action of tail winds. The following theory explains the reasons why.

Case (A)

In a propeller of any given fixed pitch and size mounted on a drive shaft for rotation in air of given density, and air that is still relative to the ground, if propeller thrust action is to be developed to a given number of pounds continuous pull in the direction of its tractive effort, it will require an engine of given power output for rotating the propeller at a given number of R. P. M. relative to the air, and the movement of the blades relative to the air will have to reach a certain rate of hitting speed or velocity relative to the air before the given number of pounds thrust action will be produced.

Case (B)

If a generator is substituted for the engine mentioned in Case (A), and a high velocity wind could be developed to travel head on into the propeller to contact or hit the blade at the same relative rate of speed as required in Case (A), the force of the wind driving the propeller windmill fashion would produce as much power as was consumed by the engine in Case (A), but in this case the thrust action upon the drive shaft would be in the reverse direction. Here it will be noted that the air will be moving relative to the blades, which differs from Case (A) in which case the blades are moving relative to the air, however, the relative rate of blade and air hitting speed would be the same in both cases.

Case (C)

Instead of the generator, suppose the engine is again connected with the propeller drive shaft and driven at the same number of R. P. M. as required in Case (A), that a head wind is developed of the same velocity as in Case (B). Here we would have two oppositely disposed thrust action forces working at cross purposes on the same shaft, each neutralizing the thrust action force of the other, whereby the thrust action upon the drive shaft would be reduced to zero in either direction.

Case (D)

With all factors such as blade pitch, propeller R. P. M., etc., the same as in Case (A), and should a tail wind be set up, then the thrust efficiency of the propeller would be increased over and above Case (A) in lineal rate of travel during flight, commensurate with the speed and force of the wind coming into contact with the tractive effort side of the whirling propeller blades.

It will be pointed out that the propeller will be turning in the same direction in all four of above mentioned cases, and it will be noted that each case represents a different combination of relative movement between air and propeller blades, only two of which are adaptable for producing thrust of standard value or above, where operation is under a given constant speed number of propeller R. P. M., as in Cases A and D.

Case (C) represents an extreme case of a cross between propeller action as in Case (A) and windmill action as in Case (B). Here on the propeller side of the operation the wind is traveling away from the back tractive side of the blades as fast as they would be able to displace it operating in still air. It is therefore impossible for the blades to hit the air with any force, and since this hitting force is reduced to zero there can be no thrust travel of the propeller along its axis of rotation, which leaves the engine unloaded with no tractive resistance for it to work against.

On the windmill side of the operation, since the engine will be rotating the propeller at the top number of R. P. M., the forward or tractive effort side of the blades will be turned out of the wind as fast as the latter could drive the propeller working against a generator as in Case (B), and would be unable to develop any thrust effort along the axis of the drive shaft windmill fashion. This is a case where two oppositely disposed thrust action forces are at work on the same shaft, fighting each other for control of the blades to see if the latter shall serve as a propeller or a windmill.

It is apparent from the above that when the speed of an engine is restricted so as not to exceed a given number of R. P. M. the propeller thrust efficiency will be of normal value only so long as the operation is entirely free from head winds, that the thrust efficiency of the propeller will be subnormal to the extent of the velocity of the wind to the rotational speed of the propeller.

While Case (A) specifies a fixed pitch propeller, a governor-controlled propeller would develop the same amount of thrust effort at the same number of engine and propeller R. P. M., provided the governor is in proper adjustment, since in this case no wind or movement of air relative to the propeller is involved, the blades would automatically assume the same pitch as the fixed pitch propeller, assuming the latter has the correct pitch.

In the operation of governor controlled propeller mechanisms, the value of ship drag, and the value of propeller thrust constitute the two main forces entering into this type of propeller control. In conjunction with these two forces the governor operates to equalize the power output of the engine between ship-drag and propeller thrust. It performs the function of altering the angle of attack and thrust position of the blades to correspond with variations in ship-drag, and derives its initiative to alter the blade pitch from variations in blade torque reaction upon the engine caused by variations in ship-drag.

Where the air is still relative to the ground, it will be still relative to the ship and the ship's propeller. The ship and propeller will be moving relative to the still air, and there will be no movement of the air itself relative to the ship and propeller. In this case with the engine and propeller restricted so as not to exceed a given speed (R. P. M.), the blades will have a comparatively constant rate of hitting speed relative to the air, and the air will have a comparatively constant tractive resistance value at a given altitude for the engine and propeller to work against.

This condition will give the propeller a stabilized thrust action to serve as a dependable base force, to and from which the speed responsive governor can operate to adjust the thrust position of the blades to compensate for variations of the variable ship-drag force, caused by variations in air density. So long as the thrust force maintains a stabilized value with respect to the variable ship-drag force, the governor will perform its function perfectly and alter the blade pitch according to variations in ship-drag.

However, just the instant a head wind creeps into the operation the thrust force of the propeller will lose its stabilizing influence to the extent of the velocity of the wind to the rotational speed of the propeller. The thrust force then becomes a variable factor, and the governor will lose proper control over the blade pitch, it simply cannot perform properly working under the influence of two variable factors.

The foregoing theory explains how a head wind will interfere to change the propeller thrust force from a stabilized force into a variable force, by causing a loss in the rate of hitting speed and movement of the blades relative to the air, in the proportion of the velocity of the wind to the rotational speed of the propeller, under which condition the thrust force of the propeller is bound to drop, and where there is a drop in the propeller thrust value there will be a corresponding drop in ship-drag and loss in relative ship and air speed, which action will partially unload the engine, allowing the latter to go into the top number of cruising R. M. P., at which R. P. M. the governor will operate to increase the blade pitch out of proportion to air density. This action prevents such mechanisms from maintaining a blade pitch commensurate with air density and ship-drag.

If normal relative ship and air speed is to be maintained in a head wind, the ship-drag against the propeller must work will be the same as in still air operation, and the same value in propeller thrust efficiency will be required; therefore it is important that the same blade pitch be maintained as before the wind was encountered, together with a sufficient increase in the number of engine and propeller R. P. M. to make up for the velocity of the wind, to restore the normal rate of blade hitting speed relative to the air. In this way only can normal relative ship and air speed be maintained where the ship is held in level or horizontal flight by a robot pilot.

To allow an increase in blade pitch under the above circumstances is to sacrifice propeller thrust efficiency in order to increase the effect of blade torque to hold down the number of engine R. P. M. To so increase the blade pitch merely changes the angle at which the blades contact or hit the air, it does not change the rate of blade hitting speed relative to the air to make up for the velocity of the wind which has robbed the propeller blades of their normal rate of hitting speed relative to the air.

Since the value in ship-drag and relative ship and air speed should be the same operating in still air or in a head wind, it is apparent that any increase in blade pitch caused by a head wind is not in order, and is just as wrong as it would be to employ the same advanced blade pitch in still air operation in the first place.

The danger of increasing the blade pitch due to head winds is not quite so dangerous flying at some high altitude, where the blades already have a normal pitch close to the maximum pitch allowed by the blade pitch limiting stops, but should this happen at a comparatively low altitude where the normal mean operating pitch is in some intermediate position considerable distance back of the maximum blade pitch limiting stops, there might be grave danger, should the loss in blade torque reaction due to an extremely high velocity wind cause the mechanism to move or jump the blades too far beyond normal pitch position. They would be free to go all the way through to the maximum limiting stops provided the wind is of high enough velocity.

In the operation of governor-controlled propellers, it has been customary to caution pilots not to exceed a given number of engine R. P. M., for the reason that such increase in engine speed (R. P. M.) will cause the governor to increase the blade pitch out of proportion to air density, whereby the pilot would have to readjust the governor to suit each change in number of engine R. P. M.

Such warning prevents the pilot from using reserve engine speed (R. P. M.) to compensate for head winds. Furthermore, where head winds cause a loss in blade hitting speed and thrust value, the engine becomes partially unloaded, and to an extent commensurate with the velocity of the wind. This action causes the engine to go into the top number of cruising R. P. M. Whenever this happens, it sets up a fault, or leak for a still further loss in propeller thrust value by operating the governor to increase the blade pitch, which is not in order, and if allowed to occur, will result in a blade thrust position out of proportion to air density and ship-drag.

Provided a pilot discovers head winds in time, they can be compensated for by increased tension of the governor control spring, together with a corresponding increase in engine R. P. M. Such measures however are apt to be rather difficult on multi-motored ships, especially under violent, gusty, head wind conditions.

It can be seen from the foregoing, that the influence of variations in propeller torque reaction upon the engine serves as the initiating factor for altering the thrust position of the blades to conform with variations in ship-drag.

It can also be seen that it is safe to allow an increase in blade pitch out of proportion to air density and ship-drag only when there is an easing off in ship-drag upon the engine and propeller, as for instance where the plane is nosed downward into a dive or glide, in which case the engine can still be operated at any desired constant number of R. P. M., and the propeller thrust action made to cooperate with the force of gravity acting upon the ship throughout a prolonged dive or glide merely by the provision of an adjustable maximum blade pitch limiting means, and the movement of same well toward full feathering pitch position so as not to interfere with a wide increase in blade pitch, whereby the governor will operate to alter the blade pitch commensurate with the number of engine R. P. M. and the velocity of the ship, and thereby prevent windmill action from driving the engine at an excessive number of R. P. M.

In such operation, while the influence of propeller thrust will become less and less as the blades are moved toward full feathering pitch position, whatever thrust is developed will be just that much in cooperation with gravity acting upon the ship, whereby phenominal speeds may be obtained in glides to objectives over comparatively long distances from high altitude positions. Continuous propeller thrust action during prolonged dives or glides would have a much better stabilizing influence upon a ship in the guidance of the latter than where windmill action is allowed to act as a brake against the descending force developed in the progress of the plane, to say nothing about the saving in wear and tear upon the engine and propeller.

In power dives and glides, windmill action will be set up depending upon the angle of blade pitch and the number of engine and propeller R. P. M., which two factors, in relation to the velocity of the plane will determine the terminal rate of travel of the propeller along its axis, at which point windmill action will begin to creep into the operation.

Where a robot pilot is employed for controlling a plane in horizontal flight, and the plane is caught suddenly in the path of a high velocity tail wind, it will suffer a loss in air speed and ship drag corresponding to the suddenness and velocity of the wind.

The loss in ship drag will have the effect of partially unloading the engine, allowing the latter to speed up enough to influence the governor to make a corresponding increase in blade pitch.

Where a tail wind is allowed to arbitrarily increase the pitch commensurate with loss in ship-drag, the propeller is very apt to suffier a greater percentage of loss in propeller thrust action than the percentage of loss in ship-drag, whereby the propeller might not be left with enough thrust value to maintain flight under the reduced ship-drag caused by the tail wind.

Whereas, if the propeller blades were held in a pitch position somewhere near normal, or commensurate with air density, the propeller would have its normal rate of thrust travel plus the velocity of the tail wind. This would insure that the value of ship drag and control of the governor would remain under the powerful influence of propeller thrust action at all times.

Should the increase in blade pitch be so wide as to reach or pass a point where the propeller could not produce enough thrust value with which to pick up the inertia of the ship and regain air speed and ship-drag, the control of the governor would then pass from under the influence of propeller thrust action.

Control of the governor will remain under the influence of propeller thrust only so long as there is sufficient thrust value to pick up the inertia and air speed of the ship to restore the value of ship-drag, which factor operates to reload the engine and with the cooperation of blade torque reaction, slows down the R. P. M. of the engine to a point where the governor will operate the mechanism for reducing the blade pitch towards normal value, commensurate with air density, as fast as the drag of the ship is returned toward normal value.

If a tail wind will unload the engine by causing a loss in ship-drag value, nothing but propeller thrust action will restore the value of ship-drag for reloading the engine where a ship is maintained in absolute horizontal flight, therefore the blade pitch must never be so far advanced that the propeller will lose its thrust influence over the value of ship-drag, and in turn control of the governor.

The instant propeller thrust value drops to a point where it is unable to restore ship-drag value, at that instant thrust action surrenders its part in control of the governor, the engine will be allowed to remain at top number of cruising R. P. M., and cause the governor to increase the blade pitch until the maximum blade pitch limiting means become effective. If this happens to be a point way out of proportion to a pitch commensurate with air density, as might easily happen in flying at some low altitude, the above mentioned complication is very apt to develop.

A pilot might not be aware of any danger until the engine begins to buck under the load due to the extreme advance blade pitch as the engine will be allowed to operate at top number of cruising R. P. M., up until just before the bucking action sets in. This bucking action will set in as soon as the ship loses a certain amount of air speed.

Since the propeller serves as the power transmission mechanism between the power plant and the plane, maximum overall efficiency of the power plant and the plane cannot be developed until maximum propeller thrust efficiency is developed by means of a blade pitch commensurate with air density and ship-drag, whereby a minimum number of engine and propeller R. P. M. is converted into a maximum amount of relative ship and air speed.

Therefore, maximum overall efficiency of the plane and its power plant should not be considered as being a result produced, that is separate and apart from maximum propeller thrust efficiency, for without the latter the first would appear to be an impossibility.

For this reason, an adjustable blade pitch limiting means, that becomes effective simultaneously as the wind is encountered, is equally as important in tail as in head winds, the same adjustment normally being required in either case to limit the blade pitch to a safe position commensurate with air density.

OBJECTS

It is therefore among the objects of this invention, to provide a safety blade pitch limiting or motor control means for governor controlled variable pitch propeller mechanisms, to render such mechanisms ineffective to increase the pitch of the blades beyond predetermined limits commensurate with air density irrespective of engine and propeller R. P. M., whereby the latter can be operated at normal cruising R. P. M., under normal flying conditions, or a higher R. P. M. to compensate for head winds without increasing the pitch of the blades, and to enable the pilot at any time to increase the engine R. P. M. to meet any emergency, accomplish any maneuver without fear of increasing the pitch of the blades out of proportion to the density of the air in which the plane is operating.

In illustrating the invention, applicant is also disclosing improvements for the operation of hydraulic propellers of the types covered by Patents 1,894,047 and 1,894,048, both dated January 10, 1933, in which relatively rotating connections are avoided in the oil pressure lines for operating the blade pitch changing mechanism by putting the pump on the drive shaft along with the hydraulic motor, and whereby, with the improvements enumerated herein, the propeller can be operated either as a constant speed, as an automatic variable pitch, or in a selective pitch manner, independent of, or in opposition to the action of a speed responsive means of blade pitch control.

Another object of the invention is to provide a hydraulic system comprising a pump for causing a continuous forced circulation of a liquid, with a blade pitch control valve located in the hydraulic circuit between the pump and motor, whereby the liquid from the pump can be diverted for operating the motor in either of two directions, or by-passed back to the pump sump without having to pass through the motor and in which system a spring pressed relief valve is avoided.

Other objects are to provide means for moving the motor control or blade pitch limiting means into an extreme advanced position for the duration of prolonged power dives or glides, to enable the governor control mechanism to control the pitch of the blades during such manuever between blade torque reaction and windmill action, whereby the pitch of the blades will be automatically adjusted commensurate and simultaneously with the increasing or decreasing velocity of the plane;

To provide a hydraulic system in which the control valve and all pipe lines entering into operation of the system are located close to the engine whereby the heat from the latter will prevent freezing of any of the pipe lines, as might be the case where a plane is forced to land due to any cause in subzero weather;

To provide a motion transmission member operated by the movement of the motor and mounted for operation in a path between the motor and the motor control means, means for creating lost motion between the motion transmission member and the motor control means, and adjustable means for altering the extent of lost motion between the motion transmission member and the motor control means for adjusting the point at which the motion transmission member will operate the motor control means for controlling the operation of the motor when the propeller blades reach a predetermined pitch position;

To provide manual means for selectively controlling the pitch of the blades from any desired minimum pitch position to full feathering pitch position, and to hold them in any selective pitch position in opposition to the action of the speed responsive means, in case the latter is employed, and to provide constant lubrication for the relatively rotating valve control parts;

To provide means for forcing the pitch of the blades to synchronize where two or more propellers are employed on ths same ship. This is important if absolute equal distribution of propeller thrust power is to be brought to bear upon a ship;

To provide a control valve located between the pump and the motor, said valve having ports that serve alternately as intake and exhaust ports, and a separate, neutral exhaust port, allowing a liquid to flow unrestricted from the pump, back to the pump sump until such time as it is needed to drive the motor for affecting change in blade pitch, thereby abosrbing no appreciable amount of engine power, except as the motor for moving the blades is caused to operate;

To provide a variable pitch propeller in which the motor means by which the blade pitch is adjusted is controlled to render the motor inoperative to further increase the pitch by three separate means, one of which is responsive to pitch, thereby absorving no appreciable amount speed and the third being manually controlled so that the pitch at which the other two become operative can be predetermined by the pilot.

A further object of the invention is to provide an air density responsive device for altering the extent of lost motion between the motion transmission member and the motor control means commensurate with variations in air density.

A still further object is to provide for an increase in the number of engine R. P. M. as the only means by which head winds can be successfully met, enabling the pilot to watch his air speed indicator, and increase the engine R. P. M. enough above normal cruising R. P. M. to make up for the velocity of the wind or until the air speed indicator shows the plane has normal air speed.

DESCRIPTION

In order to describe this invention and the means employed to obtain the objects and purposes above set out, reference will now be had to the accompanying drawings in which the invention has been illustrated in its preferred form, and in which:

Figure 1 is a longitudinal diametrical section through the pitch varying and control mechanism, taken on line 1—1, Figure 3;

Figure 2 is a fragmentary section taken on line 2—2, Figure 1;

Figure 3 is a transverse section taken on line 3—3, Figure 1;

Figure 4 is a transverse section taken substantially on line 4—4, Figure 1;

Figure 5 is a transverse section taken on line 5—5, Figure 1;

Figure 11 is a view partly in section and partly in elevation showing a mechanism provided with a series of levers positioned within easy reach of the pilot for controlling the pitch varying mechanism of the propeller;

Figure 12 is a section taken on line 12—12, Figure 11;

Figure 13 is a section taken on line 13—13, Figure 11;

Figure 14 is a section taken on line 14—14, Figure 11;

Figure 15 is a section taken on line 15—15, Figure 11;

Figure 16 is a section taken on line 16—16, Figure 11;

Figure 17 is a section taken on line 17—17, Figure 11;

Figure 18 is a section taken on line 18—18, Figure 11;

Figure 19 is a section taken on line 19—19, Figure 11;

Figure 20 is a diametrical section through an aneroid barometer of a large size whose function is to effect changes to compensate for air density;

Figure 21 is a side elevation of a spring clip looking in the direction of arrows 21—21, Figure 20;

Figure 22 is a diagrammatic sectional view intended to illustrate the position of the springs shown in Figure 20;

Figure 23 is a view showing a bell crank lever mechanism whose function is to adjust the position of the barometer;

Figure 24 is a view partly in section and partly in elevation showing a diagrammatic representation of a modified form of construction;

Figure 25 is a fragmentary view showing a detail of the construction;

Figure 26 is a view partly in section and partly in elevation, showing a still further modification;

Figure 27 is a section taken on line 27—27, Figure 26;

Figure 28 is a fragmentary detail similar to that shown in Figure 25;

Figure 29 is a detail view showing in elevation two interconnected parts of the mechanism;

Figure 30 is a side elevation showing one form of adjusting mechanism;

Figure 31 is a section taken on line 31—31, Figure 30;

Figure 32 is a fragmentary section taken on line 32—32, Figure 30;

Figure 33 is a modification of Fig. 26, showing a specifically different motion transmission mechanism;

Figure 34 is a fragmentary section showing another modification of Fig. 26, in which a manually controlled stop limits the increase in the pitch angle; and Figure 35 is a diagram employed in connection with the explanation of the operation.

Figure 6:
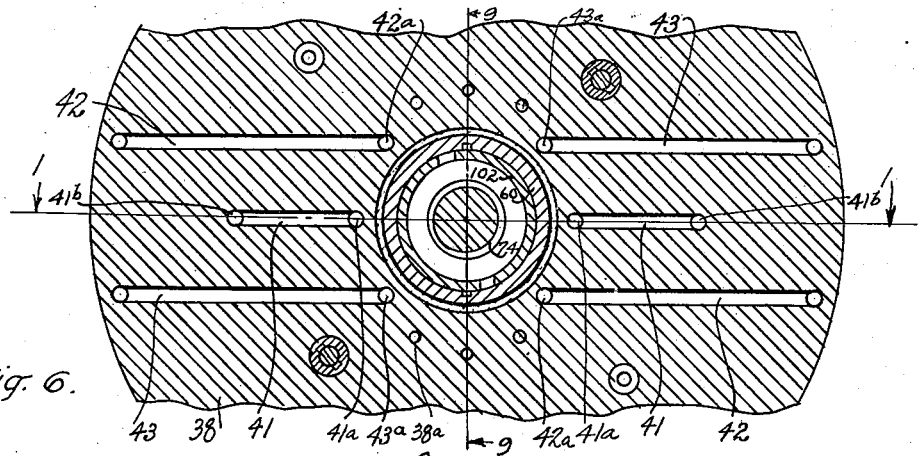
Figure 6 is a section taken on line 6—6, Figure 1.

In the drawings reference numeral 20 designates the propeller shaft which in a construction where the propeller is directly connected with the engine may also be the crank shaft of the engine, but where the propeller is connected to the engine by means of gears for the purpose of obtaining a gear reduction shaft 20 is positioned parallel to the crank shaft and connected with the latter by means of suitable gears, one of which has been designated by reference numeral 21. Reference numeral 22 designates a wall of the crank case of the engine and reference numeral 23 designates the top wall of a gear case which is positioned to the front of the crank case. The upper wall is provided with an opening 24 that is closed by a cover 25 held in place by suitable bolts 26. The front wall of the gear case has been designated by reference numeral 27 and the bottom by reference numeral 28. Reference numeral 29 designates the propeller shaft bearing in the crank case wall and reference numeral 30 the bearing in the front wall of the gear case. The bearing 30 has been shown as an ordinary ball bearing and this is held in place by means of plates 31 and 32 that are secured to the wall 27 by means of bolts 33. The propeller shaft is hollow and reference numeral 34 designates the wall of the opening therein.

In the embodiment shown, the propeller shaft is made in two parts, the front part having been designated by numeral 20a. The part of the shaft designated by reference numeral 20 has an outwardly extending wall or flange 35 which terminates in a forwardly extending cylindrical flange 36 that is provided with threaded openings for the reception of cap screws 37. The rear end of the front part of the crank shaft is provided with an outwardly extending wall 38 that terminates in a rearwardly extending cylindrical flange 39 which is provided about its rear edge with an outwardly extending flange 40 that is provided with openings for the reception of the cap screws 37. It will be observed that when the two parts 20 and 20a are assembled, they form a chamber between the two walls 35 and 38 and positioned within this chamber are various mechanisms which will be hereinafter described.

Referring now more particularly to Figure 6 it will be seen that the wall 38 is provided with three parallel passageways or openings extending from each side of a diameter. The central opening has been designated by reference numeral 41 and has been shown by full lines in Figure 1. Positioned to the left of opening 41, when viewed as in the upper half of Figure 6 is an opening 42 and a similar opening 43 is positioned to the right of opening 41. The position of openings 42 and 43 are reversed in the lower half of Figure 6. Openings 41 connect with longitudinally extending openings 41a in the shaft 20a and openings 42 and 43 in a similar manner connect with openings 42a and 43a in the shaft.

Figure 7:
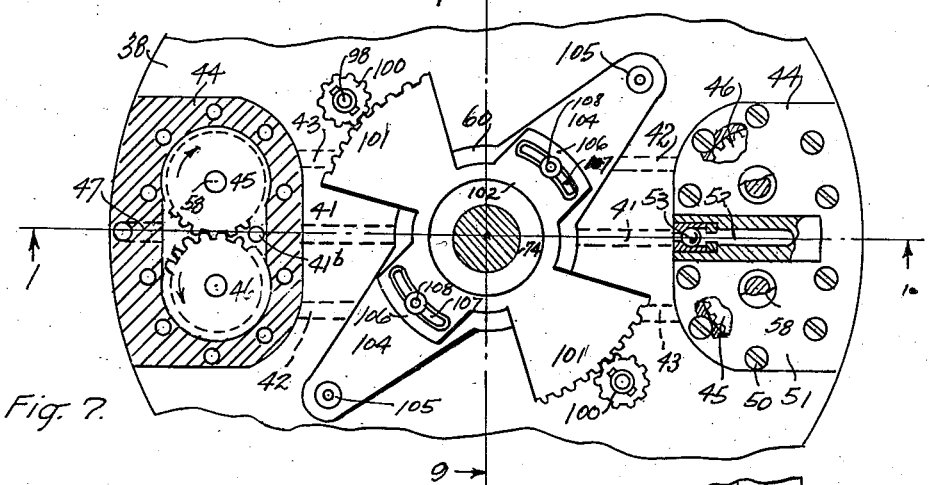
Figure 7 is a section taken on line 7—7, Figure 1.

Referring now more particularly to Figure 7, it will be observed that wall 38 is provided on its rear side with thickened parts 44 that form housings for gear pumps, the two gears of which have been designated by reference numerals 45 and 46. The discharge ports of these pumps have been designated by reference characters 41b, which are continuations of the openings 41, while the intake ports have been designated by reference numerals 47. The intake ports 47 are the terminals of the branches 48 of the opening 48 which in the actual embodiment is connected with the lubricating system of the engine in such a way that opening 49 always contains lubricating oil under considerable pressure. Secured to the thickened portions 44, by means of cap screws 50 are covers 51. These covers are provided with openings 52 whose upper ends are in communication with the intake ports 47 and whose other ends open into the chamber formed by the walls 35 and 38. Ball valves 53 serve a special function which will hereinafter be explained and normally prevent oil from flowing into intake ports 47 from the chamber between walls 35 and 38.

It is now apparent that if the gears 45 and 46 are rotated in the direction indicated by the arrows, oil will be transferred from the intake ports 47 to the outlet ports 41b and this will cause oil under pressure to fill the openings 41a in that portion of the shaft designated by reference character 20a.

The pumps are operated by the following mechanism. A sleeve 54 encircles part 20a of the propeller shaft and is held against rotation by splines 55, which interconnect it with the plate 31 in the manner shown in Figure 2. This interconnection holds the sleeve from rotation but permits the propeller shaft to turn therein. The rear end of the sleeve is provided with an outwardly extending flange 56 whose periphery is provided with gear teeth that mesh with corresponding teeth in gears 57. Gears 57 are nonrotatably connected with short shafts 58 whose other ends are connected with the gears 45 of the gear pumps. If we now assume that the parts rotate in the direction of the arrow in Figure 3, gears 57 will rotate about the axes of shafts 58 in counterclockwise direction as indicated by the arrows and this will cause the gears 45 to rotate in clockwise direction when viewed as in Figure 7. It will therefore be apparent that whenever the shaft 20a is rotating, the two gear pumps will function to transfer oil from the intake ports 47 to the outlet ports 41b and means must therefore be provided to bypass this oil or in other ways to prevent the formation of excessive pressures during operation. It will be seen from Figure 1 that openings 59 are provided in the wall of shaft 20a which extend from the openings 41 to the interior of the shaft and these openings serve as by-passes in a manner which will presently appear.

Positioned in the shaft is a tubular valve that has been designated by reference numeral 60. The outside diameter of this valve is such that it fits the inside of the crank shaft with a sliding fit and the outer surface thereof has been provided with depressions or annular grooves 61, 62, 63 and 64. The groove 62 is normally positioned so as to communicate with the openings 41a and is therefore always in communication with the outlet or discharge ports of the pump. When the parts are in normal position, the annular ribs or walls 65 and 66 cover the openings of conduits 42a and 43a respectively so that oil cannot flow to the motor in either direction, but when the valve member is in this position, groove 64 registers with the bypass opening 59 to permit the oil to flow into groove 64 and thence into the chamber between walls 38 and 35 and thence out through a plurality of openings 38a in wall 38, thus lubricating the various relatively rotating parts and is then returned to the engine pump sump through opening 38b. The grooves 61 and 63 are in communication at all times with grooves 61a and 63a and serve as exhaust ports in a manner which will appear as the description proceeds.

Figure 8:
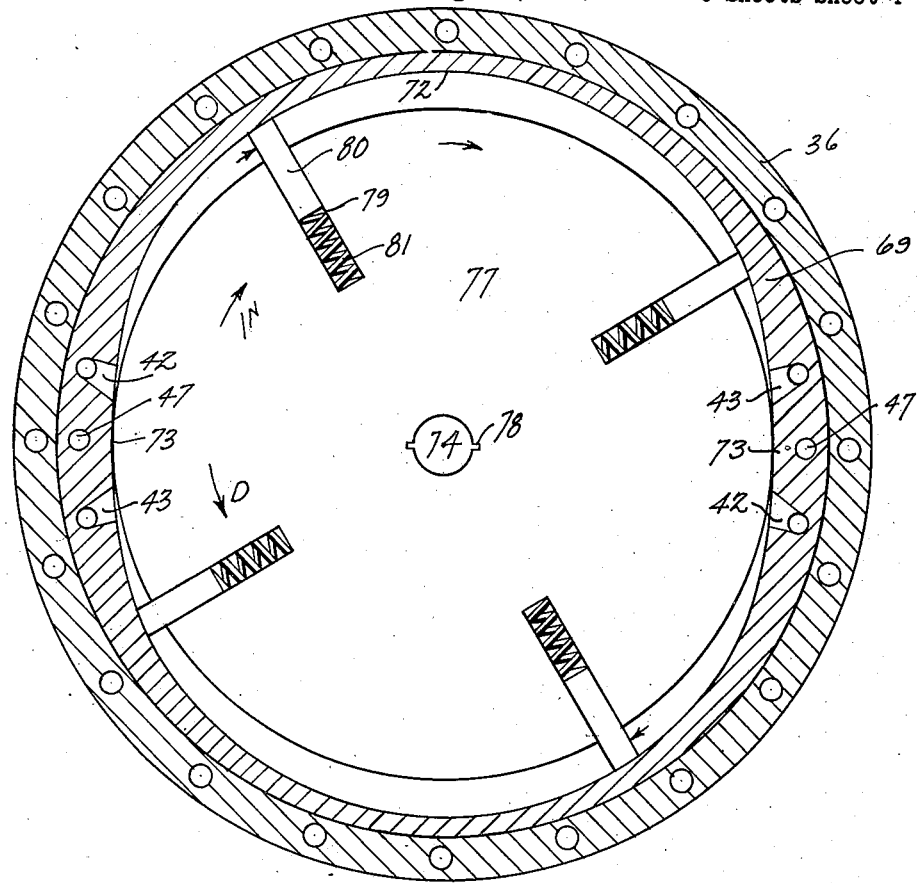
Figure 8 is a section taken on line 8—8, Figure 1.

Referring now to Figures 1 and 8 it will be seen that a circular member 67 is positioned in the chamber between walls 35 and 38 and has an outwardly extending flange 68 that projects into the space between flanges 36 and 40 so as to be held in position by the bolts 37. Member 67 has an annular rearwardly extending flange 69 to which a cover plate 70 is secured by means of screws or bolts 71.

Referring now to Figure 8, it will be observed that the flange 69 is of different thicknesses along different points and forms an oblong chamber whose inner wall has been designated by reference numeral 72. The thickest portions of flange 69 are positioned at points 73 that are diametrically opposite each other. A shaft 74 projects through openings in members 67 and 70 as shown in Figure 1 and a stuffing box 75 is provided where this shaft goes through the opening in part 67. The rear end of shaft 74 is threaded for the reception of a nut 76. A motor rotor 77 is positioned in the chamber formed by the parts 67 and 70 and the inner surface of flange 69. This rotor is nonrotatably secured to the shaft 74 by means of splines 78.

It will be seen from Figure 8 that the rotor 77 is provided with four radial slots 79 within which are slidably mounted plates 80. Helical compression springs 81 are positioned between the inner ends of plates 80 and the bottoms of slots 79. These springs serve to urge the blades against the inner surface 72 of flange 69 in a manner quite common in connection with rotary motors. It will be observed that four ports enter the pump, two of which have been designated by reference numerals 42 and two by reference numerals 43. If liquid under pressure is introduced through the ports 42, the pressure of this liquid acting against the plates 80 will produce a clockwise rotation of the rotor 77, but if the liquid is introduced through the ports 43, the rotor will rotate in the opposite direction. When one set of ports serve as intake ports, the other set will serve as outlet ports from the motor.

Figure 9:
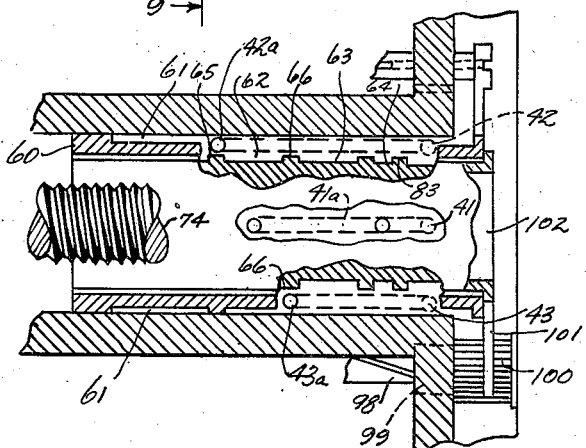
Figure 9 is a section taken on lines 9—9, Figure 3, 6 and 7.

When the valve 60 is in the position shown in Figures 1 and 9, the entrances into openings 43a and 42a are closed by the walls or ribs 66 and 65, respectively, and therefore oil can neither enter nor leave the motor. If valve 60 is now moved towards the right, the wall 65 will pass to the right of the entrance into opening 42a and rib 66 will move towards the right of the entrance 43a, thereby connecting ports 42 of the pump with the exhaust groove 61 and connecting the inlet port 43 with the pressure groove 62 and at the same time closing the openings 59 by the rib 82. Oil will now flow through opening 43a and enter the pump through the ports 43, thereby producing counterclockwise rotation and at the same time any oil between the rotor and the flange 69 will be exhausted through ports 42 and pass into the exhaust groove 61 and from thence to the interior of valve 60 into the groove 61a from whence it will pass into the chamber between walls 35 and 38. If valve 60 is now moved towards the left to the position shown in Figures 1 and 9, the oil will be trapped so as to positively hold the rotor 77 against movement in either direction. If the rotor is to be rotated in the opposite direction, valve 60 is moved towards the left until rib 65 uncovers the opening into 42a, thereby connecting the same with the pressure groove 62 and at the same time rib 66 will uncover the opening into 43a, thereby connecting the same with the exhaust groove 63 and simultaneously therewith rib 63 will close the bypass openings 59. Oil will now flow into the motor through ports 42 and exhausts therefrom through ports 43. It will be apparent from the above that whenever the gear pumps are operating the rotor 77 can be caused to turn in either direction relative to the housing in which it is positioned by merely moving the valve member 60 towards the right or towards the left, a comparatively short distance.

The position of the valve is controlled by means which will now be described. Attention has already been called to sleeve 54 which is held against rotation and which is provided on its outer surface with splines 55. Slidably mounted on sleeve 54 is a sleeve 84 whose outer surface is provided with splines 85. A sleeve 86 is mounted on sleeve 84 and its outer surface is provided with splines 87. It will be observed that the inner end of sleeve 84 has an outwardly extending flange 88. Sleeve 84 has a shoulder 89 against which the sleeve 86 abuts and the latter is provided with a flange 90 which cooperates with flange 88 to form a groove for the reception of ring 91, which is rotatably mounted in the groove. A ring 92 is threadedly connected with the front end of sleeve 84 and serves to hold the sleeve 86 against the shoulder 89. A sleeve 93 is slidably mounted on sleeve 86 and splined thereto so that it may move longitudinally but not rotatably thereon. Sleeve 93 has a flange 94 and has its outer surface threaded as indicated by reference numeral 95. A circular ring 96 is threadedly connected with the sleeve 93 and adjusted in spaced relation with the flange 94 so as to provide a groove for the reception of ring 97 which can rotate freely in the groove thus provided.

Referring now to Figure 4, it will be observed that ring 91 is provided at diametrically opposite points with openings for the reception of helical rods 98 which are held against rotation with respect to the ring and whose inner ends engage in helical grooves in the hubs 99 of pinions 100. Whenever sleeve 84 moves longitudinally on sleeve 54, it moves ring 91 in a corresponding manner and this motion moves the helical rods 98 with respect to the pinions 100 and thereby cause the latter to rotate about their axes. The pinions 100 are in operative engagement with toothed segments 101, and therefore whenever these pinions rotate, they will produce a corresponding rotation of segments 101. The toothed segments 101 extend from a tubular member 102 which will be referred to as a stop and which extends into the valve 60 in the manner shown in Figure 1 and therefore whenever the pinions turn about their axes, the stop 102 will rotate in a corresponding manner within the valve. A reference to Figure 1 will show that the tubular stop 102 is provided on opposite sides with openings having helical walls 103 on one side. The purpose and operation of the tubular stop will be further explained as this description proceeds.

Valve 60 is provided at its inner end with radially extending arms 104, which are shown quite clearly in Figure 7 and secured to the ends of these arms are rods 105 that extend through the wall 38 and have their forward ends connected with ring 97 at diametrically opposed points as shown in Figure 5.

From the above it will be apparent that whenever ring 91 is moved longitudinally, it will impart a corresponding movement to the helical bars 98 and they in turn will rotate the pinions 100, whereupon the tubular stop 102 will rotate relative to the valve 60 and whenever ring 97 moves longitudinally, it will transmit this motion by means of rods 105 to the arms 104 of the tubular valve 60 and shift the latter for the purpose of controlling the flow of oil to the motor and to determine the direction of rotation of the latter as well as to hold it in any desired position.

Referring now to Figure 7, it will be observed that the tubular stop 102 is provided in addition to the radial segments 101 with two radial extensions 106 that are provided with radial slots 107. Bolts or pins 108 are connected at their inner ends to the radial arms 104 and project through the slots 107 and since these pins have enlarged heads, they hold the tubular valve 60 and the tubular stop 102 from moving relative to each other in a longitudinal direction, but permit them to have relative rotary movement. When the tubular valve is moved longitudinally in response to movement of ring 97 which carries with it the tubular stop and consequently the arcuate segments 101 move in corresponding manner along the pinions 100, which are made of considerable length so as to permit this adjustment while maintaining the pinions and segments in operative engagement.

The rotation of shaft 74 varies the pitch angle of the propeller blades, one of which has been shown in Figure 1 and indicated by reference character "B." The propeller blade and pitch adjusting mechanism has been shown diagrammatically as an extension of the main portion of Figure 1 and from this diagram it will be observed that shaft 74 is provided at its front end with a spur gear 109 which meshes with another similar gear 110 that is connected to one end of shaft 111. This shaft has two worms 112 and 113. The root portion of blade "B" is nonrotatably connected with a gear 114 and motion is transmitted to this gear from the worms 112 and 113 by means of worm gears 115, shafts 116 and pinions 117. It will now be apparent that whenever shaft 74 rotates, it will produce a corresponding change in the pitch angle of the propeller blade and the direction of this change will depend on the direction of rotation of the shaft 74, which in turn is controlled by the direction in which the rotor 77 turns and this is controlled by the position of the tubular valve 60 in a manner which has heretofore been described.

It will be seen from Figure 1 that shaft 74 has a threaded portion 118 on which is mounted a nut 119. This nut is provided with diametrically extending projection 120 that projects through the openings in the tubular stop 102 and have their ends positioned in longitudinally extending grooves in the inner surface of tubular valve 60. It will now be seen that since valve 60 cannot rotate, the nut, which is nonrotatably connected therewith, is also held from rotation, but is free to move longitudinally in response to the rotation of shaft 74. From Figure 1 it will be seen that the extent to which nut 119 can move towards the right depends on the rotary position of stop 102 and whenever the radial projections 120 engage the helical stop walls 103 while moving towards the right, they move the tubular stop in a corresponding manner and since the tubular stop is connected with valve 60 by means of bolts or pins 108 any longitudinal movement of stop 102 will be transmitted to the tubular valve 60 and when the valve reaches the neutral position shown in Figure 1, the operation of the motor will cease and this will determine the extent of the increase of the pitch angle of the blade.

It might be explained here that the parts are so adjusted that when the rotor 77 rotates in a clockwise direction when viewed as in Figure 8, it rotates shaft 74 in a direction to increase the pitch angle and when it rotates in a counter-clockwise direction, it serves to decrease the pitch angle. When the motor operates to increase the pitch angle, the nut 119 moves towards the right and when the motor operates to decrease the pitch angle, this nut moves towards the left. The direction of rotation of the motor is controlled by means which will be hereinafter described, and which comprises a lever that is pivoted at 122 and has arms 123 that are connected to pins 124 on the threaded ring 96.

Since the pitch angles must vary in accordance with the speed of rotation and since the latter is controlled to a great extent by the torque resistance offered by the propeller, it is desirable to control the pitch angle by speed responsive means and in the present embodiment centrifugal governors have been provided for this purpose.

In the drawings reference numeral 125 represents a weight at the end of arm 126 that forms part of a bell crank whose other arm has been designated by 127. The bell crank is pivoted at 128. The arms 127 are forked so as to embrace the rods 105 and the latter are provided with pins 129 that engage the front sides of the crank arms 127. When the assembly is rotating the centrifugal force tends to rotate the weight 125, in a counterclockwise direction, about pivot 128 and this in turn produces a force that tends to move the rods 105, together with the tubular stop and tubular valve, towards the left. When the valve is moved a sufficient distance towards the left to uncover the opening 42a in Figure 9, the motor will start operating to increase the pitch and this will continue until the increased resistance slows the rotation sufficiently to permit the valve to be moved to neutral position by the action of spring 130 whose relationship to this part of the mechanism will presently be described. Unless the valve is returned manually to neutral position, the motor will continue to operate until the projections 120 engage the helical edges 103 and move the stop and valve to neutral position. The maximum angle to which the motor will adjust the propeller blade is determined by the rotary position of stop 102 with respect to the tubular valve member 60 and this, as has already been described, can be varied by rotating the pinions 100.

Attention has already been called to the fact that pinions 100 are rotated by means of helically splined rods 98 that are nonrotatably connected with ring 91 as shown in Figure 4 and for the purpose of shifting the position of these rods longitudinally a mechanism has been provided which comprises the lever 131 that is pivoted at 132.

Arms 133 connect the lever 131 with pins 134 thta are carried by the ring 92. It is therefore evident that whenever lever 131 is rocked about the pivot 132 it will move ring 92, together with ring 91 longitudinally and this in turn will move the rods 98 within the hubs of pinions 100, thereby causing the latter to rotate and this rotation is transmitted to the gear segment 101, whereby the tubular stop member 102 is rotated about its axis. If we examine Figure 1, we will find that if the tubular stop 102 is rotated so as to bring the edge 103 downwardly, the projection 120 will be free to move farther towards the right before they engage the stop and therefore the pitch of the blades will be adjusted to a greater angle before the motor is cut off. Lever 131 can be manually or automatically controlled by means which will presently be described and in this way it is possible to effect adjustments while the propeller is operating which adjustments will determine the maximum pitch angle.

In Figure 1 reference numeral 135 represents a rod that is connected to the movable end of lever 121 and reference numeral 136 designates a similar rod connected to the free end of lever 131.

Referring now to the right half of Figure 11, it will be observed that rods 135 are pivotally attached to the ends of crank arms 135a while rods 136 are pivotally connected to the ends of crank arms 136a. It will be observed that four sets of rods and crank arms are shown in Figure 11 which correspond to a four-engine aeroplane, there being one rod 136 and one rod 135 connected with each propeller mechanism. The right half of Figure 11 controls one pair of engines and propellers and the left half another pair, the two halves are of identical construction and the same reference numerals have therefore been used to designate the parts of identical construction and function. Means is provided whereby the pilot may manually control the direction of rotation of the motor which changes the blade pitch and also the position of the tubular stop 102 and the mechanism by means of which this is effected has been shown in Figure 11 shows two sets of control members and the set located to the right of the figure has been shown partly in longitudinal section. In this figure each set is provided with four bearings which have been designated by reference numerals 137, 138, 139 and 140. These bearings are secured to some stationary part of the ship which has not been shown in the drawings. Numeral 141 represents a tubular shaft that is rotatably mounted on a tubular shaft designated by reference numeral 142 and this in turn is rotatably mounted on a tubular shaft 143 while the latter is rotatably mounted on the tubular shaft 144. It will thus be seen that the four tubular shafts are concentric and are journaled one on the other. Attached to the inner end of shaft 141 is a lever 145 that terminates in a hand grip portion 146. Whenever lever 145 is rocked this rotates shaft 141 and imparts a corresponding rotation to the crank arm 135a which in turn transmits this motion to the connecting rod 135 and whenever this rod moves it rocks lever 121, thereby moving the ring 97 longitudinally and effecting a longitudinal movement of rods 105 which in turn transmit this motion to the tubular valve 60 it is now evident that by means of the lever 146, the pilot may move the tubular valve 60 longitudinally so as to control the direction of motion of the motor that changes the pitch of the blades. Lever 145a is connected with the tubular shaft 142 and the outer end of this shaft is welded or otherwise provided with an extension 142a that has an outwardly projecting flange 147 which is connected by means of a bolt or rivet 148 with a corresponding flange 149 of shaft 150. Another crank arm 135a is connected to the outer end of shaft 150 and therefore whenever lever 145a is rocked it will impart a corresponding movement to the crank arm 135a, whereby the valve 60 associated with the other propeller will be controlled in the same manner as already described in connection with crank arm 145. The arrangements of shafts, crank arms and levers shown to the right in Figure 11 is duplicated on the left of this figure and will therefore not be further described.

The position of the tubular stop 102 can be controlled by the pilot by means of the following mechanism. A lever 151 is connected at its under end with tubular shaft 143 and the latter can therefore be rotated by means of this lever. A crank arm 136a is nonrotatably secured to the outer end of shaft 143 and connecting rod 136 is pivotally connected with the outer end of this crank arm. The motion of connecting rod 136 is transmitted to lever 131 which in turn transmits the same to ring 91, whereby the helical rods 98 are reciprocated and pinions 100 are thereby caused to turn about their axes and to impart a corresponding movement to the tubular stop 102. A lever 151a is connected with the end of tubular shaft 144 to the outer end of which a crank arm 136a is connected. By rocking lever 151a the stop associated with the other propeller adjusting mechanism is controlled. For the purpose of controlling the stops associated with the other two propeller adjusting mechanisms, two other levers corresponding to levers 151 and 151a are provided.

In the foregoing portions of the specification, reference was made to a spring 130 which was shown associated with the lever 121, the function of this spring being to produce a force that urges the rod 105 towards the right when viewed as in Figure 1, thereby maintaining the pin 129 in contact with arm 127 of the centrifugal governor. Spring 130 was shown in Figure 1 mainly for convenience of description and springs performing the same function have been shown in Figure 11 and have been designated by reference numerals 130a. The springs shown in Figure 11 are under compression and act on the crank arms 152 and 153 that are connected respectively with tubular shafts 141 and 142.

Referring now to Figure 12, it will be seen that crank arm 152 encircles shaft 141 and is held against rotation by means of splines 154. Pivotally attached to the free end of crank arm 152 is a rod 155 that extends through the spring 130a and through an opening in a plate 156. Mounted in suitable bearings on plate 156 are two cams 157 and 158. The bearings have been designated by reference numerals 159. The two cams are interconnected by means of sprocket gears 160 that constrain them to rotate in opposite directions. A lever 161 is nonrotatably connected with one of the cams and is held in place by means of a nut 162. Lever 161 is positioned between guides 163. It will be seen from Figure 12 that whenever the lever 161 is turned in a clockwise direction, it compresses springs 130a and this in turn increases the resistance to movement which resistance opposes the action of the centrifugal governors and by this adjustment the speed at which the valve 60 responds to a certain force exerted by the governor can be varied.

Referring now to Figure 12, it will be observed that the rod 155 is provided with nuts 164 against which the upper ends of springs 130a abut and these nuts serve as means for adjusting the tension of the springs to obtain equal tension against the crank arms 152 and 153.

Reference numeral 165 indicates an antifriction bearing. Numeral 166 designates a brake shoe formed on the free end of a resilient bar 167 that is permanently attached to plate 156 by means of bolts 168. The tension of the bar 167 is such that the brake shoe will normally engage the circular portion of crank arm 152. The pressure of this brake shoe can be removed by means of a cam 169 that can be controlled by means of a lever 170. When the cam is brought into dead center position, it will release the brake but when it is moved away from this position, it will permit the brake to function. The function performed by these brakes is to produce a resistance of such magnitude that the valve 60 will not respond to the action of the centrifugal governors and its position can therefore be adjusted by means of levers 145 and 145a and will remain in such manually adjusted positions until the brakes are rendered inoperative by the action of the cam. The tension of the brake, however, is not sufficient to prevent manual control and it will also yield to the force exerted by the nut 119 engaging the stop 102.

It is well understood that the density of the air diminishes with the altitude and that the lighter or more rarefied air at higher altitudes does not offer the same resistance to the propeller blades as the more dense air near the earth's surface and for the best operation it is therefore desirable to increase the pitch of the propeller blades in accordance with the altitude.

For the purpose of effecting an automatic pitch adjustment as the altitude increases, a mechanism responsive to air density has been provided and one embodiment thereof illustrated.

Referring now more particularly to Figure 20, reference numeral 171 designates guide members that are secured to the aeroplane and provided with splines 172 that engage in grooves in the sides 173. The body of the barometer comprises a circular cup-like member whose cylindrical sides have been indicated by 173 and whose bottom has been indicated by reference numeral 174. A tubular guide member extends upwardly from the inner surface of the bottom and slidably mounted on this is a piston-like member 176 that has an upwardly extending tubular portion 177 that is provided on its inner surface with splines 178 which engage grooves in the guide member 175. The piston is somewhat smaller in diameter than the inside of the cylindrical body and is hermetically sealed to the latter by a flexible diaphragm 179 which is secured along its lower edge to the piston and along its upper edge to the sides 173. A plurality of helical springs 180 are arranged around the tubular guide 175 in the manner shown in Figure 22 and these springs tend to move the piston upwardly. The under surface of the bottom is provided with two spaced lugs 181 between which is pivotally connected a link 182 whose lower end is pivoted to the free end of lever 183. If we now refer to Figure 23, it will be seen that lever 183 is one arm of a bell crank lever whose other arm has been designated by reference numeral 184. This bell crank lever is pivoted at 185 the pivot being carried by a bracket 186 that is secured to a portion of the airship fuselage 187. The upper end of lever 184 is provided with a ratchet mechanism comprising a pawl 187 that engages in ratchet teeth on the convex edge of a quadrant 188. It will be apparent that by moving lever 184, the barometer or air density responsive device can be moved relative to the stationary guides 171. The outer end of the tubular portion 177 is provided with a flange 189 to which is secured a metal body 190 that carries a plurality of pairs of spring fingers 191. These fingers are provided on their adjacent surfaces with depressions 192 whose walls are bevelled.

Referring now to Figure 11, the fingers 191 are shown as embracing the levers 151 and 151a. From Figures 14 and 15 it will be seen that levers 151 and 151a are provided with pins 193 that will enter the depressions 192 when the levers are inserted between the spring fingers. If we now assume that the spring fingers are connected with the levers which control the tubular stop 102 in the manner shown in Figure 11, then all of these stops will be automatically adjusted in accordance with air density. The connection between levers 151, 151a and the resilient fingers is not a positive connection due to the inclined sides of the recesses 192, but the pilot can by exercising sufficient force detach any one of the levers from the finger clips and thereby control the stop of any propeller mechanism manually as distinguished from the automatic control that takes place when the levers are connected with the air density responsive device.

Figure 10:
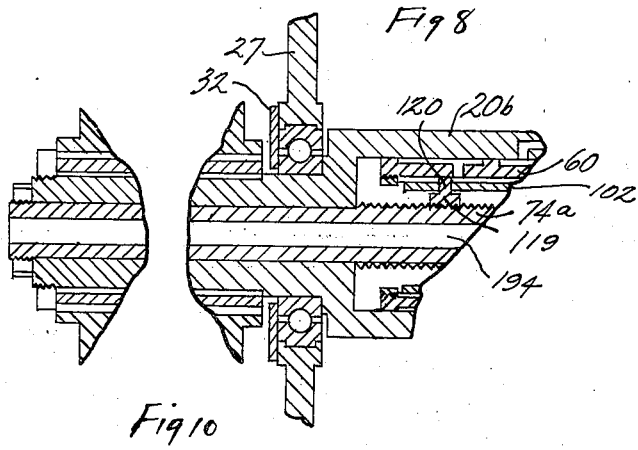
Figure 10 is a fragmentary section similar to that shown in Figure 1 and shows a slightly modified construction.

In Figure 10, a slightly modified construction has been shown for the purpose of providing a mechanism in which machine gun bullets can be fired through the shaft 74. In order to provide this shaft with an opening 194 of sufficient size to serve as a gun barrel, the diameter of the shaft should be increased and in Figure 10 shaft 74a has been shown as substituted for the shaft 74. Since this shaft is somewhat larger in diameter the cooperating parts have been correspondingly increased in size and have been designated by similar reference characters.

Referring now more particularly to Figure 24 which shows a modified form of the invention, reference numeral 195 shows a portion of the crank case wall from which a wall 196 extends forardly and terminates in an end wall 197. Reference numeral 198 represents one part of the propeller drive shaft and this has a circular flange 199 that is connected along its peripherial edge to the flange 200 of housing portion of the drive shaft. The part designated by reference numeral 77 is the rotor of the pitch adjusting motor that is shown in Figure 8. A tubular shaft 201 extends through an axial opening in the drive shaft and terminates in a threaded end portion 202 to which a nut 203 is connected. A spur gear 204 is nonrotatably connected with the tubular shaft 201 so as to be rotated therewith and this gear corresponds to the spur gear 189 shown in Figure 1.

In the embodiment illustrated in Figure 1 the control valve and the pump for maintaining the oil under pressure is carried by the rotating shaft, whereas in the embodiment illustrated in Figure 24, the pump is carried by the crank case and a portion of Figure 24 is broken away to show a gear 205 that forms part of a gear pump which serves to maintain a constant flow of oil for use in operating the motor that changes the pitch of the propeller blades. A gear 206 carried by the drive shaft serves to operate the gear pump whenever the engine is running. The oil for use in operating the parts is contained in a sump 207 from which a pipe 208 extends to the intake port of the pump and a pipe 209 extends from the delivery port of the pump to a pressure chamber 210 in the body 211 of a slide valve which will be hereinafter more fully described. When the rotor 77 is turning it carries with it the tubular shaft 201 because the two are held against relative rotation by means of splines. A ring gear 212 is splined to the tubular shaft and this cooperates with a spur gear 213 that is carried by the shaft and which is nonrotatably mounted on a shaft 214 whose front end is threaded and engages in a threaded opening in the inner ball race 215 of a ball bearing whose outer ball race has been designated by reference numeral 216. There are two gears 213 and two threaded shafts 214, which are operated in unison and therefore when shaft 214 turns in one direction, it moves the ball bearing towards the left and when it turns in the opposite direction it moves it towards the right. Two arms 217 are nonrotatably connected to a shaft 218 and extend downwardly on opposite sides of the ball race 216 and have their lower ends attached to the pivots 219 and therefore whenever the ball race moves longitudinally, it will rock shaft 218 about its axis. A lever 220 has one end nonrotatably secured to the shaft 218 and has a connecting rod 221 pivotally connected with its free end. The other end of this connecting rod is connected by means of a pivot 222 with the free end of a lever 223 that is pivoted at 224. It is now evident that whenever the ball race 216 moves towards the right or towards the left, the lever 223, together with the arm 225 which is integral therewith will rock about pivot 224. The purpose of this movement will appear as the description proceeds.

Referring now to shaft 218, it will be seen that this is journaled in bearings in links 226 that are pivoted at 227. This link permits the shaft to move so as to prevent any binding action due to the change of angle when the ball race 216 moves.

Since the ball race 216 is operated directly from the tubular shaft 201 and since the latter by its rotation controls the pitch of the blade, it is evident that the movement of lever 223 corresponds to the pitch adjustment of the propeller blade and arm 225 serves as a pitch indicator for a purpose that will hereinafter appear. The valve body 211 has a chamber 210 and has a central cylindrical opening 228 in which is positioned a slide valve 229. Chamber 210 is connected with the opening 228 by means of ports 230 and 231. On the other side of the valve body, it is provided with a longitudinally extending opening 232 that is in communication with the cylindrical opening 228 through four ports which have been designated as $a$, $b$, $c$ and $d$. A movable part of the slide valve which has been designated by reference numeral 229 is provided with annular recesses that have been designated by reference numerals $e$, $f$, $g$, $h$ and $i$. The wall of the valve body has two openings which have been designated by 42x and 43x. These openings or ports are in communication with conduits 42y and 43y respectively. When the engine is operating with the parts in the position shown in Figure 24, the pump will draw oil from the sump 207 and discharge it through pipe 209 into compartment 210 from which it flows through the annular recess $h$ and passes through the port $c$ into the longitudinal opening 232 from whence it returns to the sump 207. It will be observed that the upper end of the slide valve 229 is provided with a chamber 233 in which is rotatably positioned a head 234 that is integral with the lower end of a rod 235. This rod extends upwardly through a hollow shaft 236 and terminates in a cross piece 237 which extends through slots 238 in the wall of the tubular shaft. Shaft 236 is rotatably mounted in a bearing 239 formed in a member stationary with respect to the fuselage and is held against downward movement by a collar 240. Secured to the upper end of shaft 236 is a plug or cap 241 which is provided with diametrically positioned ends or lugs 242 to which the upper ends of the governor arms 243 are pivoted. These arms carry balls 244 and have pivotally attached to them at points 245 links 246 whose lower ends are pivoted to the cross bar 237. The tubular shaft is provided with a bevel gear 247 that is driven by a similar gear 248 carried on shaft 249 to the other end of which a spur gear 250 is attached. This spur gear is in mesh with gear 206 on the drive shaft and therefore the governor will rotate at a speed corresponding to the speed of the drive shaft. It will now be apparent that when the speed increases the governor balls 244 will move upwardly and carry with them the rod 235 which in turn moves the slide valve 229 upwardly. When this valve is moved sufficiently to uncover port $42x$ oil under pressure will flow from the chamber 210 through port $42x$, thence through conduit $42y$ and into the motor entering the latter through ports 42 thereby rotating part 77 in a direction to increase the pitch of the propeller blade. Simultaneously with the uncovering of port $42x$ the port $43x$ will be uncovered so that oil from the motor will be discharged through port 43 and conduit $43y$ into the annular recess $e$ from which it will flow through the port $a$ and into the sump 207. If, on the other hand, the speed diminishes so as to let the balls drop, the slide valve will move down and this will place the port $43x$ in communication with the pressure chamber 210 and port $42x$ in communication with the annular recess $g$ which is in communication with the vertical passage 232 through opening $b$. When the parts are in this position, the motor shown in Figure 8 will rotate in a direction to decrease the pitch. The parts are so adjusted that when the speed has a predetermined value, the slide valve is positioned as in Figure 24, which permits the oil from the pump to circulate freely from the sump through pipe 208, through the pump, thence through pipe 209 into the downward passage 232 and into the sump 207. Whenever the rotor turns it also turns the shaft 201 and this in turn rotates the threaded shaft 214 in a direction to move the ball race 215 towards the left when viewed as in Figure 24. This movement is transmitted to lever 220 which moves in a clockwise direction and transmits a corresponding movement to lever 223. When the maximum pitch desired has been reached, the arm 251 will engage the upper end of the hour glass shaped member 252 and any other increase in the blade angle will force the slide valve downwardly into neutral position whereupon all further movement will stop. It is often desirable for the pilot to adjust the maximum pitch of the propeller blades to conform to varying conditions and for this purpose manually operable means have been provided for effecting a selective adjustment. It will be observed from Figure 24 that the arm 251 is pivoted at 253 and is provided with a gear segment 254. A pinion 255 is secured to a shaft 256 and held in operative engagement with the gear segment 254. A lever 257 is nonrotatably connected with the shaft 256 and therefore by rocking this lever about the pivot 256 arm 251 will be rocked about pivot 253. A detent comprising a spring pressed pawl 258 holds lever 257 in adjusted position. It is evident that if lever 257 is moved so as to impart a clockwise rotation to arm 251, the latter will engage the top of member 252 at a smaller angle than if it were in its present position and this adjustment makes it possible for the pilot to control the maximum pitch angle during flight.

In cases of emergency it may be necessary for the pilot to render the automatic pitch adjusting mechanism inoperative and to set the propellers at what he believes to be the most desirable pitch under the circumstances and for this purpose the mechanism has been provided which will now be described.

The slide valve shown in Figure 24 and the parts secured to the upper end thereof are shown as taken on line 24—24, Figure 25, and the latter is a view looking downwardly along plane 25—25, Figure 24. It will be observed that the top cover of the slide valve cylinder, which cover has been designated by reference numeral 259, extends to one side of the cylinder and is provided with an upward projection 260 that forks and terminates in two upwardly extending arms 261 that are provided with bearings 262 in which the pivots 263 are journaled. Mounted on the pivot 263 is a body having its lower surface 264 cylindrical and its upper surface provided with two cylindrical plugs 265 and 266. The part 260 has a cylindrical opening 267 in which is positioned a tubular member 268 having slidably mounted therein a plug 269 that is urged upwardly by a spring. Plug 269 serves as a brake shoe for engaging the cylindrical surface 264 and holding the body against movement about pivots 263. Lever 270 is mounted on the plug 265 and has a cylindrical portion 271 that has an opening for the reception of plug 266. This lever is held in place by means of a nut 272. Lever 270 can be rotated about the center of plug 266 from the full line to the dotted line positions shown in Figure 25. When this lever is in full line position, it engages in the depression between the ends of member 252 and can therefore control the movement of the slide valve when force is applied to this lever. The friction between the surface 264 and the brake shoe is sufficient to resist the action of the governor and it is therefore possible for the pilot to take control from the governor and to hold the slide valve in neutral position or to increase or decrease the pitch of the propeller blades to any extent he may desire within the limits of the mechanism.

In United States Patent No. 2,032,255, granted February 25, 1936, a propeller mechanism has been shown in which the blades have attached two inertia members that function to increase the pitch of the blades in accordance with the speed of the propeller. This patent is also provided with a hydraulic mechanism comprising a cylinder and a piston which serves to reduce the pitch of the blades in response to a governor that controls the flow of oil from a power operated pump located in the crank case. In Figures 26 to 29, inclusive, a modification of the invention above described has been illustrated in which reference numerals 273 and 274 are two parts of a propeller hub and these are held together by means of bolts 275 that extend through lugs 276. The part designated by reference numeral 277 is the movable end of a cylinder corresponding to the element designated by reference numeral 6 in the patent above identified. The propeller blades have root portions 278 that are provided with outwardly extending shoulders 279 that resist the centrifugal forces developed. The blades are also provided with bevel gears 280 that cooperate with a bevel gear 281 that is rotated on the cylindrical portion 282 of the hub. The hub has a helical groove 283 whose purpose will hereinafter appear. The gear 281 has an elongated hub that is provided with notches 284 that receive the cooperating fingers 285 carried by the sleeve 286 which is also rotatable on the hub 282. The sleeve 286 is provided with an annular outwardly extending portion 287 that forms the inner race for a ball bearing whose outer ball race has been designated by 288. The ball race 288 is provided with diametrically positioned trunnions 289 that cooperate with the bearings 290 in arms 291 which extend radially from a shaft 292. Shaft 292 is journalled in bearings 293 and has attached to one end thereof a lever 294 to the free end of which a connecting rod 295 is attached. The other end of rod 295 is connected by a pivot 296 with the upper end of a lever 297 that extends from a plate 298 which is carried by a pivot 299. Plate 298 has an integral arm 300 and has pivotally connected therewith an arm 301 that is mounted for rotary adjustment about a pivot 302. The inner end of arm 301 is provided with a gear segment 303 that is operatively associated with a pinion 304. This pinion is secured to a shaft 305 to one end of which a lever 306 is nonrotatably connected. This lever has a spring pressed detent 307 that cooperates with a notched quadrant 308. It is evident that by turning the lever 306, pinion 304 will be rotated and this will impart a corresponding rotation to arm 301, thereby changing its angle with respect to arm 300. When lever 306 is moved in a counterclockwise direction when viewed as in Figure 26, the angle between 300 and 301 will increase and when it is moved in the opposite direction this angle will decrease in a manner quite apparent from the drawings. Reference numeral 20b represents the crank shaft and this is journalled in a bearing 309 carried by the crank case 310. The shaft is provided with a bevel gear 311 and with this a similar gear 312 is operatively connected. The dotted line indicated by numeral 313 represents a shaft that connects the gear 312 with gear 314 of a gear pump whose cooperating gear has been designated by 315. This gear pump can be located at any suitable position in the crank case and has been shown as surrounded by a metal body 316. The intake port of this pump has been designated by reference numeral 317 and the outlet port by 318. The inlet and outlet ports are connected by a bypass 319 which is normally closed by a spring pressed relief valve 320. Since the relief valve will open if the pressure exceeds a predetermined amount, it is evident that the pump can continue to operate on a closed circuit. Reference numeral 321 designates an oil sump and reference numeral 322 designates the intake pipe through which the oil flows to the gear pump. The outlet port communicates with a cylindrical chamber 323 that has an outlet opening 324. A balanced valve comprising a cylindrical portion 325 and a shorter cylindrical portion 326 that are connected by a rod 327 is operatively positioned in the chamber 323. When the parts are in the position shown in Figure 26, it is evident that oil from the gear pump cannot leave the outlet chamber and therefore builds up sufficient pressure to open the relief valve, whereupon the oil flows in a closed circuit. If, now the valve is moved downwardly so that the cylindrical portion 326 becomes positioned wholly below the outlet 324, oil from the pump will flow into the pipe 324 and from thence to an annular groove 328 on the inside of the bearing 329. The shaft is provided with an opening 330 that always communicates the interior of the shaft with the groove 328 and since the opening in the shaft is closed by means of a plug 331, the pressure is communicated to the interior of cylinder 277 and this turns the propeller blades in a direction to reduce the pitch angle in a manner shown and described in Patent No. 2,032,255, above referred to.

Centrifugal weights 332 are connected with the propeller blades in such a manner that they increase the pitch in accordance with the speed of the propeller.

The outlet chamber 323 merges into a larger chamber 333 in which the flanged head 334 of the cylindrical plug 325 is positioned. A conical helical spring 336 rests on the flange 334 and has its upper end in abutting relation with a sleeve 337 that is slidable on the shaft 338. The sleeve 337 is provided on its outer surface with gear teeth which cooperate with a pinion 339 that can be turned by means of a handle 340. When the handle is moved in a clockwise direction when viewed as in Figure 26, it moves the sleeve 337 downwardly and increases the tension of the spring. An hour glass shaped block of metal 341 is nonslidably attached to shaft 338 as shown in the drawings. A centrifugal governor having balls rotates about the axis of member 343. This governor is driven from the gear 311 by a suitable motion transmission mechanism which has been indicated by dotted line 344. The part of the governor designated by reference numeral 345 is slid on member 343 and as the speed increases, this part moves downwardly in response to the centrifugal action. A lever 346 is pivoted at 347 and connects the movable part 345 with the hour glass shaped part 341 and moves the latter in accordance with the action of the governor. When the governor increases in speed, it raises member 341 and the balance valve comprising plugs 325 and 326. When the valve is in the position shown, it permits oil from the cylinder to return to the sump through pipe 324 and this removes opposition to the pitch increasing action of the inertia members 332 which therefore continue to increase the pitch of the blades. When the pitch has increased sufficiently to reach the maximum for which the parts are adjusted, the speed of the propeller will decrease, whereupon the governor will operate to move the balance valve downwardly until the cylindrical plug 326 closes the opening from pipe 324 whereupon the pitch will remain until the speed is altered. If the speed decreases beyond the predetermined amount, the balance valve will move downwardly until the cylindrical portion 326 comes to a point below the pipe 324, whereupon oil will be forced into the cylinder 277 and decrease the pitch, thereby permitting the propeller to turn faster whereupon the cylindrical plug 326 will move to a position closing the inlet to pipe 324. Normally the pitch will remain at a predetermined value and only change sufficiently to permit valve member 326 to reciprocate from a point above to a point below pipe 324.

The maximum pitch position is controlled positively by means of the mechanism which has been described and which comprises the arms 300 and 301. It has already been explained that when the propeller blades move to increase the pitch, arm 300 will move downwardly and if this movement continues until the arm 301 engages the upper end of member 341, the force exerted by arm 301 will move the valve 326 into closed position with respect to opening of pipe 324, thus trapping oil in this pipe and cylinder 277 to resist a further increase in blade pitch due to the action of the inertia weights 332. By adjusting the position of lever 306, the maximum pitch angle can be controlled because the angle between arms 300 and 301 can be adjusted in the manner above described.

In case of emergency it may be desired to take control away from the governor and for this purpose a mechanism comprising lever 270 can be swung into position so as to engage the part 341 and hold the same in any adjusted position. The parts associated with lever 270 are shown in Figure 24 where the operation has been described and this will therefore not be repeated at this point. Figure 28 corresponds to Figure 25 and the parts thereon have been given the same reference numerals as in Figures 24 and 25.

From the above it will be seen that the same regulation and automatic operation as has been described in connection with Figure 1, can be obtained with the mechanism illustrated in Figure 26 in which the gear pump is positioned within the crank case and driven from the crank shaft by means of a suitable power transmission mechanism. This arrangement is employed wherever a pump carried by the crank shaft is believed to be less desirable than an independently positioned pump. It will be observed that the automatic adjustment, the manual control of the maximum blade pitch and the complete manual control of the pitch varying mechanism can be obtained by the means illustrated in Figures 26 to 29 in substantially the same manner as with the mechanism illustrated in Figure 24.

Where the propeller pitch adjusting mechanism is controlled by an electric motor instead of a hydraulic motor, as, for example, in the construction shown in U. S. Letters Patent No. 2,124,078, of July 19, 1938, apparatus changes must be made to effect a control of an electric motor instead of a hydraulic motor.

In Figures 30, 31 and 32, a modification has been shown which can be substituted for elements shown in Figure 26 and by means of which an electric motor can be stopped when a predetermined angle is reached in substantially the same manner as the hydraulic motor shown in Figure 26.

In Figure 30, levers 294, 295 and 297 are the same as shown in Figure 26, levers 295 and 297 being connected by pivot 296. The plate 298 has been replaced by a corresponding element 298a which is provided with a toothed quadrant 303a. Lever 307 may be identical with the lever shown in Figure 26 and nonrotatably connected with shaft 305. The other end of shaft 305 has a pinion which has been indicated by reference numeral 304 in Figure 26 and this cooperates with a gear segment 303a that is part of a semicircular member 348. Member 348 is mounted on a pivot 299a which is carried by a stationary member 349 that is part of the fuselage. A bell crank lever having a horizontal arm 350 and a vertical arm 351 is pivoted at 352 and urged in a counterclockwise direction by means of a spring 353. The upper end of arm 351 carries a switch contact 354 that is insulated from the arm and to which is connected an electrical conductor 355. A cooperating switch contact 356 is secured to the stationary member 357 from which it is insulated, and this switch contact has attached to it a conductor 358. In the drawings reference numeral 359 represents a source of electric energy which, for convenience, has been indicated as a battery and reference numeral 360 designates a motor which takes the place of the hydraulic motor shown and described in connection with Figure 1. Motor 360 is connected in series with the source of electric energy and with the switch by means of conductor 361. When the switch comprising members 354 and 356 are closed, motor 360 operates to increase the pitch of the blades. A switch 362 is connected in series with conductor 361 and is controlled by a centrifugal governor 363 which corresponds to the governor 342 in Figure 26. As long as switches 354 and 362 are closed, motor 360 will operate to increase the pitch of the blades and the parts are so related to the propeller blades that as the pitch is increasing, connecting rod 295 will move towards the right when viewed as in Figure 30, whereupon member 348 will be rotated about pivot 299a. It will be observed that the bell crank arm 350 is provided with a pin 364 that rests on the peripheral edge of member 348. The latter member has one side provided with a recess 365 in which is positioned a pawl 366. This pawl is provided with an integral pin 367 whose outer end is nonrotatably connected to a lever 368. A helical compression spring 369 has one end in engagement with the free end of lever 368 and the other in engagement with a stop 370. A pin 371 limits the rotation of lever 368 in a counterclockwise direction when viewed as in Figure 30 and holds the pawl 366 in the position shown. When member 348 is rotated counterclockwise, the pin 364 will maintain its distance from the center of pivot 299a until it gets to the end of pawl 366, whereupon it will drop into the opening 365, thereby permitting the bell crank to rotate in a counterclockwise direction in response to the action of spring 353, whereupon the two switch contacts 354 and 356 will separate and open the circuit to motor 360, the pitch increase will therefore stop at this point. When the pitch decreases, member 348 will move in a clockwise direction and pin 364 will follow the bottom of opening 365 and finally emerge and rest on the periphery of member 348 as shown in Figure 30. By adjusting the position of lever 307, the maximum pitch angle can be determined in substantially the same way as explained in connection with Figure 26 where the movement of lever 306 changes the angle between arms 300 and 301.

The electrical switch mechanism that has just been described can be mounted adjacent the pilot so that he may operate lever 307 whenever he finds this necessary to set the switch to operate should the propeller blades have a tendency to exceed the most optimum pitch commensurate with air density, whereby the action of the governor will be rendered ineffective to increase the blade pitch beyond a given point due to any sudden increase in number of engine R. P. M. above normal cruising speed, caused by head winds or by the pilot increasing the engine throttle.

Under the above increased engine R. P. M. conditions and in prolonged power dives where the action of the governor is in a direction to increase the pitch of the blades, it is important that any blade pitch limiting, motor cutout switch be of the snap type to insure a sufficient gap between the terminals to avoid arcing and consequent fire hazards.

At this point attention will be called to Figures 1, 24 and 26 and to the parts numbered 60a, 233 and 233a. The shoulder formed by member 60a is engaged by the flanges 120 of nut 119 when the propeller blades reach minimum pitch position and the valve 60 is thereby moved to neutral position. This stop is not adjustable to the extent of the high pitch stop, but can be adjusted when the parts are stationary. In Figure 24, the nut 233 in cooperation with arm 225 form minimum pitch limit stops as it will be readily apparent from the drawings that as the pitch of the blades decreases, the arm 225 will move upwardly and when it engages the nut 233, it will move the same to neutral position, thereby stopping further pitch adjustment in this direction. In Figure 26 the low limit stop comprises the arm 300 and the nut 233a which operate in the same manner as the arm 225 and the nut 233 shown in Figure 24.

In Figure 33 a slightly modified form of motion transmission mechanism has been shown. In the propeller hub illustrated in this figure, the pitch adjustment is effected by a hydraulic motor having a movable cylinder 277 and a stationary piston 277a. The root portions of the blades have attached to them arms 372 that carry the centrifugal weights 332 and the latter are so arranged that as the speed increases the centrifugal force will cause the weights to move in a direction to increase the pitch of the propeller blades. There in as interconnection between the weights 332 and the movable cylinder 277 which interconnection comprises slots 373 that are engaged by pins 374 which are carried by the cylinder 277. When the cylinder moves towards the left, when seen as in Figure 33, the pitch of the propeller blades will be decreased and this will move the centrifugal weights inwardly. In order to transmit the motion from the cylinder 277 to the control mechanism located in the pilot compartment and which comprises the parts illustrated in Figures 24 and 26, the connecting rod 295 shown in Figure 26 and which corresponds to connecting rod 221 in Figure 24 is connected to the outer end of a lever 294a that corresponds to lever 220 in Figure 24 and this lever is pivoted at 375, below the pivot this lever is forked and has two arms or fingers 376 that engage with trunnions 377 on ring 378. This ring is rotatably connected with a sleeve 379 whose cross section is L-shaped, by means of balls 380. The sleeve is held against rotation with respect to hub 381 by means of splines 382. It is now apparent that the hub may rotate without rotating the ring as this can rotate freely on the cylindrical ball race of the sleeve. At diametrically opposite points, the sleeve is provided with threaded rods 383 that extend into tubular nuts 384 whose inner surfaces are threaded for engagement with the threaded rods 383. Annular stops 385 limit the longitudinal movement of the tubular nut, but permit it to rotate. It is evident that if the nut 384 is rotated the threaded rods 383 will move in a corresponding manner and when they move they move the sleeve longitudinally on the hub and rock the lever 294a which motion is transmitted to the slide valve by mechanism comprising the connecting rod 295 as already explained.

For the purpose of rotating the tubular nut, rods 386 are connected with the cylinder by means of bolts 387 and extend into the tubular nuts 384. Rods 386 are provided with coarse threads 388 that cooperate with rollers or pins extending inwardly from the tubular nuts and therefore whenever the cylinder 277 moves longitudinally it causes the tubular nuts to rotate and this rotation is transmitted by the mechanism shown to the connecting rod 295 and operates the slide valve that controls the limits to which the pitch of the propeller blades can be adjusted.

In Figure 34 a slightly modified form of construction has been shown in which normally controlled means is provided for changing the maximum pitch while the propeller is operating. In this embodiment a lever 389 is pivoted at 390 and has its outer end connected with a lever positioned adjacent the pilot which lever may be 145 or 145a. The inner end of lever 389 is provided with fingers 376a that engage trunnions 377 on the ring 378. Ring 378 is rotatably connected with the sleeve 379 in the manner shown in Figure 33, but instead of having the threaded rods 383, corresponding elements comprising rods 391 provided with coarse threads are employed. The rods 391 correspond to those designated by 386 in Figure 33 and serve to rotate the tubular nut 384 which is operatively connected with the threaded rods 392 that are held against rotation by means of screws 393 that engage in grooves 394. It is evident that whenever lever 389 is rocked about 390, threaded rods 392 can be moved in and out of the tubular sleeve. The ends of rods 392 are positioned in the path of the lug 395 on the cylinder 277 and therefore limit the motion of the cylinder towards the right, which in turn limits the maximum pitch of the blades.

From the description of Figure 34, it will be seen that the pilot can determine the maximum pitch to which the propeller blades can be rotated by merely operating a lever positioned within convenient reach.

Referring now to Figure 20 which shows a density responsive means carrying a plurality of spaced fingers 191 which are secured to the base 190. If, for any reason the density responsive mechanism is not used, the part 190 may be fastened to the stationary part of the fuselage and the depression 192 in the fingers, together with the pins 193 on levers 151 and 151a are omitted. The fingers are so adjusted that they exert sufficient pressure on the levers to hold them from accidental movement. The levers can, however, be manually adjusted and will stand in adjusted position due to the friction exerted on them.

Figure 35 is a chart intended to show the terminal rate of travel of a propeller along its axis, operating under a given number of degrees blade pitch and turning at a constant R. P. M. and is intended to show how excessive propeller and engine R. P. M. can be avoided in power dives and glides in military planes.

Say the mean diameter of the propeller is 68 inches, the mean circumference would be 214 inches or 17.80 feet. Say the blade is 10 inches wide, with the propeller turning at 2000 R. P. M. The blade shown is on the basis of 10 inches wide, shown in three-eighths scale.

The bottom of the chart shows the travel in inches between lines A—A, B—B, etc., at various degrees blade pitch simultaneously as the propeller rotates a distance the width of the blade as it is rotating about the axis of the drive shaft.

The right of the chart shows the width of the blade between lines A—A, B—B, etc., and the number of times the width of the blade will go into the mean circumference of the propeller operating at a given blade pitch.

| Number of degrees blade pitch | Width or depth of blade shown in inches between lines A—A, B—B, etc., at right of chart | Number of times width or depth of blade will go into propeller mean circumference | Longitudinal blade travel in inches as shown between lines A—A, B—B, etc., at bottom of chart, times 33 revolutions per second | M. P. H. |
|---|---|---|---|---|
| 22½ | 9¼″—A—A | 23 | 3⅜″—A—A | 161 |
| 33¼ | 8¼″—B—B | 26 | 5½″—B—B | 268 |
| 45 | 7″—C—C | 30 | 7″—C—C | 393 |
| 56¼ | 5½″—D—D | 39 | 8¼″—D—D | 602 |
| 67½ | 3⅞″—E—E | 60 | 9¼″—E—E | 1040 |
| 78.75 | 1¹³⁄₁₆″—F—F | 118 | 9⅞″—F—F | 2260 |

If it is desirable to prevent a swiftly diving or gliding plane from driving the propeller and engine at an excessive speed (R. P. M.), it will be observed in a study of the terminal rates of propeller longitudinal travel in any of the various degrees blade pitch as shown in the left hand column, that the blade pitch must be advanced to correspond with the rate of plane velocity or MPH. as shown in the column at the right. How this is accomplished is explained under operation.

From the description and arrangement of parts shown in the various embodiments, and by referring now more particularly to Figures 1, 11, 12 and 16, in which valve 60 and levers 145—145A are shown in neutral position, and as previously explained, if levers 145—145A (Fig. 16) are moved to the left, valve 60 will be moved in a direction to increase the blade pitch, and if these levers are moved to the right the blade pitch can be decreased to any desired extent, when these levers will be immediately returned to neutral position, and held against movement by brake 166, whereby the rotor 77 will be held against accidental movement in either direction by reason of valve 60 being in position for closing all ports to the hydraulic motor.

The brake 166 exerting only sufficient force to resist movement valve 60 by the action of the speed responsive governor regardless of the number of R. P. M. of the engine, whereby the most optimum blade pitch can be maintained during takeoff and landing stages of flight, and affords a manual arrangement of blade pitch control during such maneuvers whereby the propellers of a multi-motored ship can be controlled as easily as the propeller on a single-motored ship. Levers 145—145A connecting with the various propellers can be moved as a unit or separately in the event the operation of the blade moving mechanisms do not quite synchronize. It has been explained that valves 60 can be moved manually by levers 145—145A in opposition to the action of brakes 166 with the latter snapped on.

At any time after takeoff when the plane is well under way, by reducing the engines to cruising R. P. M. the brakes 166 can be released thereby turning the control of valves 60 over to the action of the speed responsive governor, when the propellers will operate under constant speed control in the usual manner.

In the event head winds are encountered which might interfere with efficient propeller operation as explained in the foregoing theory. Where a pilot is forewarned, or such head winds are discovered in time before the ship has had time to lose air speed, lever 161 can be moved in easy stages toward the right to bring springs 130a under greater tension along with a corresponding increase in engine throttle by the pilot, whereby an increase in propeller blade hitting speed will be set up to make up for loss in propeller efficiency due to the wind. In this manner, if desired the pilot can continue under constant speed propeller control where such head wind is of comparatively steady velocity, but should the wind be more or less gusty and of high velocity, manual control of the blade pitch should be resorted to by means of levers 145—145A and brake 166.

The above arrangement requires, however, that a pilot must be on guard at all times for adverse head winds, and to eliminate this fault, the correct use of a motor cutout or blade pitch limiting means such as stops 102 together with motion transmission member 119, the former moved manually into any desired position by means of levers 151—151a or by the air density responsive device shown in Figures 20 and 23. By setting stops 102 slightly in advance of nut 119, or commensurate with air density so as not to interfere with normal constant speed blade pitch control by the action of the speed responsive governor, levers 151—151a are grouped whereby the stops on the several propellers can be moved as a unit, or the same as with a single-propellered ship.

In this manner these stops 102 would stand guard against any undue increase in blade pitch due to loss in blade torque reaction caused by head winds, and allow the engine to go into top cruising number of R. P. M., which would immediately serve as a warning to the pilot that head winds were being encountered, and his only concern would be to watch his air speed indicator to see that he had enough engine R. P. M. to make up for the velocity of the wind and to even increase the number of R. P. M. if necessary, enough to maintain normal relative ship and air speed, or as in military maneuvers, with the correct setting of stops 102 the engine R. P. M. can be increased at any time to meet any emergency without increasing the pitch of the blades out of proportion to air density. Provided the helical edge 103 of stop 102 has the correct angle with reference to the projections 120 of nut 119, the valve 60 can be moved into low pitch position merely by the operation of levers 151—151a. This is important where a plane may be descending from some higher altitude to avoid a locking action of stop 102 against projections 120, especially where the air density responsive device shown in Figure 20 is employed.

In addition to manual control and operation of the propellers or operation under constant speed control, they may also be operated in an automatic variable pitch manner where an air density responsive device similar to that shown in Figure 20 is employed, merely by moving lever 161 in a manner to relieve the tension of spring 130a. The action of the governor at any normal number of R. P. M. would then be allowed to continually urge valve 60 in a direction to increase the pitch of the blades as far as stop 102 would permit, and since this stop would be controlled by the action of the air density responsive device, it is apparent that the blades would automatically assume a pitch strictly commensurate with air density, lever 184 as shown in Figure 23 enabling the pilot to set the altimeter to correspond with the altitude and air density at point of takeoff. However, where the number of engine R. P. M. has been increased as in the above or any other mentioned operation, should the engine and propeller set up an excessive pounding action at any time, this is most likely caused by the governor not being readjusted to the changed engine R. P. M. to enable it to adjust for a drop or backing away of plane velocity and air speed with respect to blade pitch as hereinafter explained. Such pounding action, where excessive, will serve as a warning to the pilot to immediately reduce the blade pitch by means of levers 145—145A, holding the blades in adjusted position by means of brake 166, to enable the pilot to make any necessary increase in number of engine R. P. M. in an emergency.

In the event of engine failure brake 166 should be immediately snapped on by means of lever 170. Levers 145—145a of the disabled propeller moved in a direction to increase the pitch of the blades, then lever 151—151a employed to turn stop 102 in a direction and to an extent so projection 120 of nut 119 will not come into contact with the helical edge 103 at any point, whereby the propeller blades will be moved into full feathering pitch position, and whereby the valve 60 will not be forced into neutral position until the nut 119 reaches the bottom 103a of stop 102 which point of contact by nut 119 will correspond with full feathering pitch of the blades. As long as the propeller continues to be turned by the engine or by windmill action driving the propeller, the gear pumps will be operated to drive the hydraulic rotor 77. The nonreversing blade moving mechanism which has been shown diagrammatically as a continuation of Figure 1, and which is especially adapted for moving the blades into full feathering pitch position, and also prevents any accidental movement of the blades from driving the rotor 77 and avoids complications in the proper working of the respective parts involved. Should the engine oil pump fail, whereby the usual supply of oil would not be delivered to intake ports 47 of the gear pumps. The drop in pressure against ball valve 53 together with centrifugal force action upon it would cause the latter to become unseated whereby oil would flow from the chamber between walls 35 and 38 and permit oil to flow into port 47 through passageway 52. In this manner the gear pumps would continue to receive oil with which to operate the propeller mechanism indefinitely and whereby the blades of the propeller on the disabled motor can be moved into full feathering pitch position by either the engine or by propeller windmill action. Where it is desired to prevent windmill action from driving the engine and propeller, during power dives and glides, all that is necessary is to first move the blade pitch limiting means into some advanced position so as not to interfere with the action of the governor to increase the blade pitch commensurate with the increasing velocity of the plane. The velocity of the latter can be controlled by the angle of of descent in many instances, the governor being left to operate to increase the pitch of the blades at normal top cruising number of R. P. M., the same as in horizontal flight. As the plane slips into the dive or glide, with the engine idling until the plane has nosed over into the dive, when it is desired to accelerate the engine to cruising speed this can be done, the thrust of the propeller cooperating with gravity to get the plane on its way, or the pilot can leave the engine idling in the first stages of the dive and let the law of gravity work against the compression of the engine if desired. In either case when the engine reaches top cruising number of R. P. M., and provided the blade pitch adjusting mechanism operates fast enough, the governor would operate automatically to increase the pitch of the blades commensurate with the speed or velocity of the plane and two factors would insure the correct blade pitch to match the velocity of the plane.

The value of blade torque reaction would rise and fall, according to the velocity of the plane, or to put it another way, with the engine operating at a given speed (R. P. M.), whenever the terminal travel of the propeller at a given blade pitch does not correspond to the velocity of the plane, blade torque reaction will be affected to either rise or fall as the case may be, and this influence upon the speed (R. P. M.) of the engine and in turn the governor will cause the mechanism to alter the pitch of the blades. Should the engine tend to drop below normal cruising speed (R. P. M.) for any reason, windmill action would become effective to increase the number of R. P. M. of the latter to bring it back to normal or top cruising number of R. P. M., in case the windmill action still prevailed. The top cruising number of R. P. M. would operate the mechanism to increase the blade pitch and thereby get away from this windmill action so that the engine could not be driven by this force and would therefore operate at constant number of R. P. M. throughout the descending part of the dive.

At the bottom of the dive, as the plane levels off into horizontal flight, simultaneously as the velocity of the plane decreases, the blade torque reaction will be increased, and this will reduce the R. P. M. of the engine and in turn cause the governor to decrease the pitch of the blades simultaneously as the speed of the plane relative to the air decreases, until the blades are finally reduced to normal pitch commensurate with air density, the pilot following this automatic decrease in blade pitch with the blade pitch limiting stops until the stops are moved into a position normal for the altitude at which the plane is flying.

Should the pilot encounter a high velocity head wind simultaneously as he levels off from a power dive, the mechanism, due to loss in blade torque reaction on account of the wind, would not decrease the pitch of the blades to normal position, corresponding to air density, and the blades would be left in a position too far advanced to produce normal propeller thrust action.

Therefore, upon leveling off from a power dive, a pilot should allow only the usual interval to lapse for the blades to assume normal pitch position for horizontal flight commensurate with air density, as he follows the reduction in blade pitch with the limiting stops. If these stops cannot be moved freely into their normal position corresponding to altitude, the pilot should resort immediately to levels 145—145A for moving the valve 60 in a direction to reduce the pitch of the blades to normal position, and then follow up with the limiting stops by means of levers 151—151a, after which he can increase the engine R. P. M. at will to compensate for the velocity of the wind.

At the bottom of a power dive, should the pilot desire to place the plane into an immediate, moderate to steep climb, careful consideration should be given to the blade moving mechanism to see that it is fast enough to reduce the blade pitch to the correct position to negotiate such climb. If the mechanism is not fast enough to reduce the blade pitch commensurate with loss in plane velocity, there would be a chance of stalling the engine, due to excessive blade pitch at a time when the correct pitch would be a very important factor, if maximum propeller thrust action is to be depended upon.

In such a case the pilot should not attempt to increase the R. P. M. of the engine until the limiting stops are moved into a position commensurate with altitude, otherwise the increased R. P. M. would cause the governor to increase the blade pitch.

Since the mechanisms shown in Figures 24, 25, 30, 33 and 34 are all provided with motion transmission members designed to cooperate with a motor cutout or adjustable blade pitch limiting means, manually adjustable from the plane cockpit, and since they are intended to perform functions similar to that described in connection with Figures 1, 11 and 12, it seems unnecessary to go into a detailed explanation of their particular manner of operation. It seems sufficient to point out that in Figure 1 the pump for driving the hydraulic motor, the control valve, governor and blade pitch limiting stops are all carried by the drive shaft and are rotatable therewith, while none of these parts are carried by drive shaft in the mechanism shown in Figure 24. This is also the case in Figure 26, but here the hydraulic motor is designed to move the blades in one direction only, as is the case in Figures 33 and 34. These last three modifications merely show three different forms of motion transmission member, showing various ways in which lost motion can be shortened or lengthened, and at which points the mechanism can be adjusted to operate to limit movement of the blades in a direction to increase their pitch.

In the construction shown in Figure 1, there are no rotating, leaky oil connections between the gear pumps and the hydraulic motor for moving the blades. This is an important feature in connection with the larger engines and propellers now coming into use. This is a feature covered in Patents Nos. 1,894,047 and 1,894,048.

The slide valves shown in Figures 1 and 24 are designed for operating a hydraulic motor in either direction to alter the pitch of the blades. The provision in these valves of a neutral exhaust port eliminates the necessity of a spring pressed relief valve, thus affording a powerful mechanism capable of efficient operation under most any load conditions, and a mechanism in which the oil is never under pressure, except when the valve is moved to alter the pitch of the blades.

Applicant is aware that various forms of motion transmission means have been invented in connection with various types of variable pitch propeller mechanisms for operating signals or pointers for indicating to the pilot what the blade pitch may be at any time, but so far as applicant is aware none of such arrangements operate to actually check, limit or control an automatic blade pitch adjusting mechanism in a manner similar to the manner in which stop 102 is employed as shown in Figure 1, or positioned in the path of the operating mechanism so as to stand guard against an undue increase in blade pitch out or proportion to air density regardless of any increase in engine R. P. M. due to any cause such as an increase in engine throttle, or loss in blade torque reaction caused by high velocity head winds, and whereby such winds will be instantaneously met with a compensating increase in engine and propeller R. P. M. in line with the theory advanced herein, and which is imperative for safe and efficient propeller operation for insuring propeller thrust value commensurate with ship drag at all times.

In such manner should a pilot encounter a sudden, violent storm with an accompanying high velocity head wind, his only concern would be to make sure that he has enough engine R. P. M. with which to maintain normal relative ship and air speed to take the ship through. Upon a subsiding of the wind, the engine R. P. M. can be reduced to normal cruising speed, when the propeller mechanism will again resume automatic blade pitch and constant speed engine control.

To eliminate guesswork on the part of the pilot, the plane cockpit should provide information for his guidance as to the correct setting of the blade pitch limit stops at cruising engine R. P. M. under normal still air operating conditions, with the plane flying both light and heavily loaded. With this definite information to start out with the pilot can make any slight corrective adjustment as the flight proceeds. This is apt to be especially important in the interests of safety and efficient propeller operation if ships of ever increasing size and tonnage are to be flown successfully and without occasional mishap.

Referring to lever 145 for moving valve 60, as shown in Figure 11. Attention is called to the fact that this lever, together with its connections with valve 60 affords nonresilient means for positively moving the valve into any desired position for operating or stopping the motor in opposition to the action of the speed responsive governor. This is important if the pilot is to have a means devoid of lost motion for operating the control valve, and gives him positive control over control valve 60 in an emergency. Similar nonresilient means 270 are provided in Figures 24 and 26 for control of the valve mechanisms shown. While it is intended as shown in Figure 1, that the pitch responsive member 119 will contact step 60A for moving valve 60 into neutral position as the blades reach maximum low pitch position, it is apparent that stop 60A can instead, serve as limiting reverse pitch stop when situated in a position of reverse propeller pitch, merely by changing the speed ratio of the pitch limiting elements 74 and 119 in relation to the position of stop 60a, thus allowing the blades to be moved through neutral pitch, and into a position of reverse thrust, whereby valve 60 would be moved in a corresponding direction by lever 145, after which the valve 60 will be held in neutral position by brake 166, against the action of the governor, and whereby the propeller can be employed as a brake to assist in reducing the length of runs during landing, thus saving wear on tires and brake linings, and to afford better braking action under icy, slippery landing conditions.

As an example in line with the theory on which this invention is based for determining the percentage of loss in propeller efficiency where a high velocity head wind is encountered, with the engine and propeller set to operate so as not to exceed a given top cruising R. P. M.

Say the top cruising propeller speed is 2000 R. P. M., and that at this R. P. M. the propeller has a suitable mean operating pitch with enough engine power to drive the plane at 180 M. P. H. relative to the ground under normal still air resistance, or through air that is still relative to the ground.

Let the mean diameter of the propeller be 68 inches, the mean circumference would be 17.75 ft. At 2000 propeller R. P. M., the blades of the latter would be rotated about the axis of the propeller at the rate of 35,500 feet per minute relative to the air. Should a 70 M. P. H. head wind be encountered, with the plane either on the ground or in flight, such wind would be traveling at the rate of 6,160 ft. per minute relative to the ground, ship and the propeller as against the above rotational blade speed, resulting in an immediate loss in blade hitting speed relative to the air of 17.3%, resulting in a corresponding loss in blade torque reaction and propeller thrust efficiency due to the wind.

With the plane traveling at 180 M. P. H. relative to the ground or still air under 2000 propeller R. P. M., should a sudden 70 M. P. H. head wind be encountered, for an instant the plane might be traveling 250 M. P. H. relative to the air, but we know this relative ship and air speed cannot be maintained as the normal cruising relative ship and air speed is only 180 M. P. H., so the plane is forced back to this relative ship and air speed and is then traveling only 110 M. P. H. relative to the ground.

This plane speed of 180 M. P. H. relative to the air and 110 M. P. H. relative to the ground cannot be maintained on account of the loss in propeller efficiency due to the 70 M. P. H. head wind or 17.3% of 180 M. P. H. (normal air speed), making this loss 31 M. P. H. relative to the air. This deducted from 110 M. P. H. brings the plane speed down to 79 M. P. H. relative to the ground, and 149 M. P. H. relative to the air. This condition will obtain even with the ordinary fixed blade pitch propeller.

It is apparent here that if the engine and propeller R. P. M. are increased 17.3% above the normal 2000 R. P. M. or to 2400 R. P. M., normal blade hitting speed relative to the air will be restored and compensate for the velocity of the wind whereby normal relative ship and air speed of 180 M. P. H., and 110 M. P. H. relative to the ground can be maintained in the face of such wind.

Since an increase in engine and propeller speed above the normal cruising R. P. M., or enough to compensate for high velocity head winds is so important for maintaining safe relative ship and air speed, and since automatic or constant speed propeller mechanisms normally operate to increase the blade torque reaction upon the engine by increasing the blade pitch as soon as the engine speed reaches top cruising R. P. M., thus preventing any increase in engine speed above normal cruising R. P. M.; and since any increase in blade pitch above the normal mean operating pitch tends to sacrifice propeller thrust efficiency to blade torque reaction, causing a still further loss in propeller thrust efficiency due to high velocity head winds, it is imperative that such propeller mechanisms should be provided with means for preventing excessive blade pitch angles of attack regardless of the necessary engine R. P. M., with which to maintain normal or safe relative ship and air speed irrespective of head wind conditions.

In torque or speed responsive propellers, where a plane is caught in the path of a high velocity tail wind, a drop in blade torque reaction will take place the same as in a head wind.

In tail winds the thrust or lineal rate of propeller travel will be increased above normal to the extent of the velocity of the wind, but due to the wind traveling in the same direction as the plane, there will be a temporary easing off in ship drag due to loss in relative ship and air speed until the engine and propeller have time to pick up the inertia of the ship to move the latter at its normal speed plus the velocity of the wind.

This temporary easing off in ship drag due to loss in relative ship and air speed has the same effect as a head wind to partially unload the engine, allowing the R. P. M. of the latter to increase enough to cause the governor to operate in a manner to increase the blade pitch, whereby propeller thrust efficiency will be sacrificed to blade torque reaction.

For this reason an adjustable blade pitch limiting means that becomes effective simultaneously as the wind is encountered is equally as important in tail as in head winds, the same adjustment normally being required in either case to limit the blade pitch to a safe position commensurate with air density.

In a sudden, extremely high velocity tail wind, a dangerous gap or break is apt to occur in the relative ship and air speed, unless the blades are mintained in a pitch position commensurate with air density, and the engine is allowed to respond immediately with increase in R. P. M. commensurate with the velocity of the wind for restoring normal relative ship and air speed as soon as possible. As soon as this is accomplished the engine speed can be safely reduced to normal cruising R. P. M.

Where large heavily laden ships are involved, especially where flight is controlled by a robot pilot, it is important that propeller thrust efficiency be at a safe value every instant according to the requirements of horizontal flight for maintaining normal relative ship and air speed.

If it is desired to simultaneously and automatically adjust the tension of spring 130a commensurate with adjustment of engine throttle to alter the R. P. M. of the engine to best meet prevailing flying conditions, this can be effected by the following means shown in Figure 12.

Reference number 396 designates the fuel supply pipe and 397 the throttle valve which controls the amount of fuel supplied to the engine and consequently its speed. Lever 398 is connected with the valve 397. A connecting rod 399 extends from one end of lever 398 to handle 161 and consequently handle 161 will move in unison with the throttle valve. A spring 400 has one end attached to a stationary part 401 and serves to assist springs 130a. The pilot controls the valve by means of a rod 402 and therefore simultaneously adjusts the throttle and the tension of springs 130a.

This arrangement is intended merely as an aid to the pilot and avoids the necessity of readjusting the tension of the governor control spring 130a every time the pilot alters the R. P. M. of the engine to best meet prevailing flying conditions.

In addition to the fault heretofore mentioned, head winds also set up another, or complemental fault, under certain conditions, in which plane velocity and air speed drop back out of coordination with respect to blade pitch, thus causing an additional disparity in blade pitch.

A head wind will substitute its own velocity for the loss it causes in plane velocity with respect to a fixed land station. Here it is important to point out, that while the rate of plane velocity has been reduced in proportion to wind velocity, the plane will have normal air speed as long as the wind continues.

However, should the wind recede suddenly after thus slowing down plane velocity, or should the pilot suddenly pull the plane out of the wind, or in case of high velocity wind squalls, where the plane and wind suddenly shift directions with respect to each other, or any combination of these factors including a quick shift from a head to a tail wind, may leave the plane for an indefinite lapse of time with a reduced rate of air speed.

In such case it is important to consider the lapse of time required for the plane to lose a given portion of its air speed, which might be within two to five seconds more or less, depending upon wind velocity and quickness of shift.

To show how a serious disparity in blade pitch may be set up, reference is had to Figure 35 and the explanatory chart in connection with same. It will be noted at plane air speeds of 161 and 268 M. P. H., the blades assume 22½ and 33¼ degrees pitch respectively, or roughly a one degree variation in pitch for each 10 M. P. H. variation in plane air speed, and shows the coordination of blade pitch with respect to plane velocity and air speed, which is necessary for smooth, efficient operation.

Using this as a basis, if the plane is traveling at 161 M. P. H., with adjustable pitch limiting stops correctly set, to guard against undue increase in blade pitch caused by wind, in case of a quick wind shift of say a 70 M. P. H. head wind, ship air speed would drop down to 91 M. P. H., and simultaneously a 7 degree disparity in blade pitch would be set up with respect to ship air speed.

Such a situation would call for an immediate reduction in blade pitch commensurate with loss in ship air speed, or to the pitch employed at a corresponding air speed during and after take-off, before top cruising speed was reached.

Otherwise, the extreme blade angle of attack will result in engine overload, which may set up a pounding or bucking action, together with a comparatively slow rate of plane acceleration in such pinches, all of which in case of trouble, might be incorrectly attributed to engine failure.

The number of degrees disparity in blade pitch with respect to plane air speed will depend upon wind velocity and quickness of shift, regardless of what the plane velocity or air speed might be at the time the wind shift takes place, thus making it more dangerous at the lower ranges of air speeds and altitudes, and should the adjustable limit stops not be correctly set the above mentioned disparity would be correspondingly greater.

Whatever this disparity might be, together with the lapse of time required to set it up, the blade moving mechanism must be fast enough to make a corresponding reduction in blade pitch within substantially the same time period in order to correct the thrust position of the blades without delay.

It is important to point out that a wind of half the above mentioned velocity or less, will set up a correspondingly dangerous disparity in blade pitch, depending upon how close the plane may be to minimum air speed when such wind shift occurs. This might not happen often, but when it does it is a bad setup, and calls for a sufficiently quick acting blade moving mechanism, in order for the engine to respond with a high degree of plane acceleration to fill in the gap in air speed.

Blade moving mechanisms have been suggested and perhaps employed having a ratio of 1 to 25,000, which under a 2000 engine R. P. M. would require about two seconds to move the blades one degree. This is believed to be too slow to meet the extreme requirements mentioned.

The above shows how two separate actions may gang up to cause an extremely dangerous disparity in blade pitch. First, a head wind, due to interfering with propeller efficiency will cause an increase in blade pitch out of proportion to plane air speed, then at a later period, should a sudden shift in direction between the wind and plane take place, this action will cause ship air speed to drop or fall away from an already increased blade pitch, thus setting up a more or less double disparity of plane air speed with respect to blade pitch.

In addition to the above, in which the factor of timing and speed of a blade moving mechanism appears so important for most efficient propeller operation, a careful study of flight requirements of any particular type plane would determine how fast the blade moving mechanism must operate to obtain split second timing for coordinating the thrust position of the blades commensurate with variations in plane velocity and air speed, as during maneuvers in combat. In the latter case, the rate of plane velocity and air speed is apt to vary widely within comparatively short intervals of time, and in which the correct thrust position of the blades at a given instant might be of utmost importance from a plane performance standpoint.

It will be seen that the degree of angle of divergence from a straight, horizontal line of flight, as in turning and climbing, forces are set up which tend to reduce plane velocity, and the element of time involved in such maneuvers, dictates what the speed of the blade moving mechanism must be, if disparities in blade pitch are to be avoided during such maneuvers. In the above, the terms "plane velocity" and "air speed" are both used. To avoid confusion, it is pointed out that they are separate and distinct factors. Plane air speed is produced entirely by plane velocity with respect to a fixed land reference point, when the air medium is perfectly still with respect to said land reference point, or where the plane is flying substantially at right angles to a cross wind, in which cases, and only then, will plane air speed and plane velocity be at the same rate of speed.

As explained, diligent adjustment of the blade pitch limiting stops will eliminate the first mentioned part of this double disparity in pitch, while the second mentioned part of the disparity can be avoided by a sufficiently quick acting, blade moving mechanism.

It is important that the blade thrust position be synchronized in keeping with any reduced rate of plane velocity and air speed due to such causes, in order to insure a high rate of plane acceleration and recovery to close any gaps in air speed without delay. This is especially important where ship inertia is more of a factor, as in case of large, heavy, capacity loaded ships, during period of approach and in circling of landing fields. Here the importance of a correct blade thrust position is comparable to the most desirable pitch employed during periods of plane takeoff.

It will be seen also, that should any emergency require the pilot to fall back on levers 145—145a, for reducing the blade pitch, he must have the same quick acting mechanism for moving the blades into correct thrust position without delay, otherwise he might be too late through no fault of his own.

However, where a pilot is familiar with this fault in a slow blade moving mechanism, and the manner in which such disparities between blade pitch and ship air speed are set up, there are many things he might be able to do to avoid trouble.

The mechanism covered by reference numerals 161, 396 to 402 inclusive, is shown in conjunction with an adjustable blade pitch limiting mechanism, and should be employed in connection therewith. Otherwise, the number of engine and propeller R. P. M. would have to be increased instantly, commensurate with wind velocity when the latter is encountered, in order to avoid a disparity in blade pitch with respect to plane velocity and air speed, and which mechanism is dealt with in application Serial No. 526,273, filed March 13, 1944.

I claim:

1. In a variable pitch propeller, in combination, means comprising a hydraulic motor for changing the pitch of the blades, means comprising a valve for controlling the operation of the motor, means comprising a governor for actuating the control valve in accordance with propeller speed to effect a corresponding change in blade pitch angles, means comprising a member operatively connected with the propeller blades for movement commensurate with the pitch thereof, for automatically actuating the control valve against the action of the governor, when the pitch angles of the blades have been increased to their predetermined limit, so as to stop the operation of the motor, and manually operable means for altering the relative positions of the pitch responsive member and the motor control valve during propeller operation, against the action of the governor, for changing the blade pitch angle limit.

2. In a variable pitch propeller, having blades mounted for pitch adjustment, means comprising a hydraulic motor for changing the pitch of the propeller blades, means comprising a valve for controlling the operation of the motor, means comprising a governor for actuating the control valve in accordance with propeller speed to effect a corresponding change in blade pitch angles, means comprising a member operatively connected with the propeller blades for movement commensurate with the pitch thereof, for automatically actuating the control valve against the action of the governor, when the pitch angles of the blades have been increased to their predetermined limit, so as to stop the operation of the motor, manually operable means for altering the relative positions of the pitch responsive member and the motor control valve during propeller operation, against the action of the governor for changing the pitch angle limit, and manually operable means for moving the control valve against the action of the governor during propeller operation for controlling the valve at the will of the operator.

3. In a variable pitch propeller having adjustable blades, in combination, means comprising a motor for changing the pitch of the propeller blades, control means for starting and stopping the motor, a governor mechanism operatively connected with the propeller and with the motor control means for stopping and starting the motor in response to propeller speed, means for automatically actuating the motor control means against the action of the governor when the pitch angles of the blades have been increased to their predetermined limit so as to stop the motor, and means operable by the operator for changing said limit during operation of the propeller.

4. In a variable pitch propeller having blades mounted for pitch adjustment, in combination, means comprising a motor for changing the pitch of the blades, means for controlling the operation of the motor, a speed responsive governor operatively connected with the last mentioned means for controlling the operation thereof, means for automatically actuating the motor control means against the action of the governor when the pitch angles of the blades have been increased to their predetermined limit, so as to stop the motor, means operable by the operator for changing said limit during operation of the propeller, and means operable by the operator for moving the control means, against the action of the governor during propeller operation.

5. In a variable pitch propeller having blades mounted for pitch adjustment, in combination, means comprising a motor for changing the pitch of the blades, means for controlling the operation of the motor, a speed responsive governor operatively connected with the last mentioned means for controlling the operation thereof, means comprising a member operatively connected with the propeller blades for movement commensurate with the pitch adjustment thereof, the motor control means being positioned to be operated by the action of the movable member to stop operation of the motor at a predetermined blade pitch angle, means comprising the speed responsive governor and a manually operable means for independently altering the relative positions of the movable pitch responsive member and the motor control means, while the propeller operates, whereby the maximum pitch angle can be adjusted automatically by the governor means and independently by the manual means.

6. In a variable pitch propeller having blades mounted for pitch adjustment, in combination, means comprising a hydraulic motor, a pump for driving the motor, means comprising a valve for controlling the flow of hydraulic fluid from the pump to the motor, a speed responsive governor operatively connected with the valve for the operation of the latter, means for automatically actuating the control valve against the action of the governor when the pitch angles of the blades have been increased to their predetermined limit so as to shut off the supply of hydraulic fluid to the pitch changing motor, means operable by the operator for changing said limit during operation of the propeller, and manual means operable by the operator during propeller operation for controlling the control valve at the will of the operator against the action of the governor, whereby the maximum blade pitch angle can be adjusted automatically in response to speed variations and independently by the manual control means.

7. In a variable pitch propeller having blades mounted for pitch adjustment, in combination, means comprising a hydraulic motor for changing the pitch of the blades, a pump for driving the motor, means comprising a valve provided with a neutral exhaust port for bypassing a liquid from the pump delivery port to its intake port without passing through the motor, said valve also having ports that serve alternately as intake and exhaust ports to the motor, whereby the latter can be operated in a direction for either increasing or decreasing the pitch of the blades, means for moving the valve into motor operating position, means for automatically actuating the control valve when the pitch angles of the blades have been adjusted to their predetermined limit, said means comprising, a member movable in a fixed path, in response to pitch angle adjustment, and a stop member operatively connected with the control valve and positioned in the path of the pitch responsive member, the two members being normally spaced apart to permit the pitch responsive member to move a predetermined amount before it contacts the stop member, whereby the valve will be moved so as to shut off the supply of hydraulic fluid to the pitch-changing motor when the blade pitch angles have reached their predetermined limit, and means operated by the operator, independently of the pitch-changing motor, for altering the relative positions of the pitch responsive member and the stop member while the propeller operates whereby the pitch angle limit can be altered during flight.

8. In a variable pitch propeller having blades mounted for pitch adjustment, in combination, means comprising a hydraulic motor for altering the pitch of the blades, a pump for producing continuous forced circulation of a liquid for driving the motor, said pump and motor being interconnected by conduits, a control valve located in the hydraulic circuit between the pump and motor, said valve being provided with a neutral exhaust port for bypassing liquid from the delivery to the inlet ports of the pump when the blades have the correct pitch position, said valve also being provided with ports that serve alternately as intake and exhaust ports to the motor for driving the latter in either of two directions, means for moving the valve to motor operating position, means comprising a member operatively connected with the propeller blades for movement, in a fixed path, commensurate with the pitch thereof, a stop element operatively connected with the valve and located in the path of the pitch responsive member and normally spaced therefrom, whereby a predetermined amount of movement of the latter will cause it to engage the stop element and move the valve into motor stopping position, and means operable by the operator for altering the relative positions of the pitch responsive member and the stop element while the propeller operates whereby the extent of blade pitch adjustment can be varied.

9. In a variable pitch propeller having blades mounted for pitch adjustment, in combination, means comprising a hydraulic motor connected with the blades for altering the pitch of the blades, a pump for producing continuous forced circulation of a liquid for driving the motor, said pump and motor interconnected by conduits, a control valve located in the hydraulic circuit between the pump and motor, said valve being provided with a neutral exhaust port for bypassing liquid from the delivery to the intake ports of the pump when the blades have the correct pitch position, said valve also being provided with ports that serve alternately as intake and exhaust ports to the motor for driving the latter in either of two directions, means comprising a speed responsive governor operatively connected with the propeller and with the valve for operating the valve to alter the pitch of the blades commensurate with variations in propeller speed, a member operatively connected with the propeller blades for movement in a fixed path, commensurate with the pitch of the blades, a stop element operatively connected with the valve and located in the path of the pitch responsive member and normally spaced therefrom, whereby a predetermined amount of movement of the latter will cause it to engage the stop element and move the valve into motor stopping position, and means operable by the operator, for altering the relative positions of the pitch responsive member and the stop element while the propeller operates whereby the extent of blade pitch adjustment can be varied.

10. A variable pitch propeller including a fluid pressure means adapted to vary the pitch of said propeller, a control valve in said pressure means, manual control means for adjusting the control valve while the propeller operates, a speed responsive device operatively connected with the propeller, means interconnecting the speed responsive device and the control valve for adjusting the valve independently of the manual control means, and means responsive to pitch variations for actuating the control valve to render the pitch varying means inoperative when a predetermined pitch value is attained.

11. In a variable pitch propeller having a speed responsive mechanism for automatically altering the pitch of the blades in either direction, a member movable in response to pitch variations and a stop device both carried by the propeller for limiting the maximum pitch adjustment; means for manually adjusting the position of the stop device relative to the pitch responsive member during propeller operation, comprising a handle accessible to the pilot, and means interconnecting the handle with the pitch limiting stop device whereby the pilot by moving the handle can control the maximum blade pitch to obtain optimum maximum blade pitch under any flying conditions independently of the speed responsive mechanism.

12. In an automatic variable pitch propeller, a drive shaft for the propeller, a motor carried by the drive shaft for rotation therewith for altering the pitch of the propeller in either direction, control means carried by the drive shaft for operating the motor, a speed responsive governor carried by the propeller, for operating the motor control means, a member mounted for movement in response to pitch variation, a pitch limiting member mounted for adjustment with respect to the pitch responsive member as the propeller operates, for altering the amount of movement necessary for said pitch responsive and pitch limiting members to cooperate for rendering the speed responsive governor ineffective to increase the pitch beyond predetermined limits corresponding to the setting of said members, manually operable means comprising a handle accessible to the pilot during flight, means responsive to movement of the handle for selectively presetting the pitch limiting member with respect to the pitch responsive member, and means comprising a friction brake mechanism for holding the pitch limiting member in adjusted position as the propeller operates.

13. In a variable pitch propeller, in combination, means comprising a motor for changing the pitch of the blades, control means for the motor, a governor mechanism for actuating the control means in accordance with propeller speed, means for automatically actuating the control means to stop the motor against the action of the governor when the pitch angles of the blades have been increased to their predetermined limit, whereby the blade pitch angle can be limited to a predetermined value, and manually operable means operable by the operator for changing said limit during propeller operation.

14. In a variable pitch propeller, in combination, means comprising a motor for changing the pitch of the blades, control means for the motor, a governor mechanism for actuating the control means in accordance with propeller speed, means for automatically actuating the control means to stop the motor against the action of the governor when the pitch angles of the blades have been increased to their predetermined limit, means operable by the operator for changing said limit during operation of the propeller, and means operable by the operator during operation of the propeller for controlling the control means at the will of the operator, comprising a device responsive to propeller speed for altering the relative positions of the pitch responsive member and the movable stop element while the propeller functions whereby the blade pitch angles can be limited to a value which is dependent on speed, manually operable means for altering the relative positions of the pitch responsive member and the movable stop element while the propeller operates whereby the maximum pitch variations can be altered, and another manually operable means for moving the motor control means independently of the speed responsive device during propeller operation.

15. In a variable pitch propeller, in combination, means comprising a motor for changing the pitch of the blades, control means for the motor, a governor mechanism for actuating the control means in accordance with propeller speed, means for automatically actuating the control means so as to stop the motor against the action of the governor when the pitch angles of the blades have been increased to their predetermined limit, whereby the blade pitch angle can be limited to a predetermined value, and means comprising an air density responsive device for automatically changing said blade pitch limit commensurate with changes in air density as the propeller operates.

16. In a variable pitch propeller, in combination, means comprising a motor for changing the pitch of the blades, control means for the motor, a governor mechanism for actuating the control means in accordance with propeller speed, means for automatically actuating the control means so as to stop the motor against the action of the governor when the pitch angles of the blades have been increased to their predetermined limit, whereby the blade pitch angle can be limited to a predetermined value, means comprising an air density responsive device for automatically changing said blade pitch limit commensurate with changes in air density as the propeller operates, and means operable by the operator for moving the air density responsive device with respect to the motor control means as the propeller operates.

17. In a variable pitch propeller having blades mounted for pitch adjustment, in combination, a hydraulic motor for altering the pitch of the blades, a source of liquid under forced circulation for driving the motor, means comprising a control valve for operating and for automatically stopping the motor when the blades reach a predetermined pitch angle, means for moving, and means for yieldingly holding the control valve in adjusted motor operating position, said automatic means for stopping the motor comprising an element mounted for movement commensurate with blade pitch adjustment and positioned in a path leading to the control valve and normally spaced therefrom, whereby a predetermined amount of movement of the pitch responsive element will cause it to contact and move the control valve against the action of the yielding holding means, to cut the source of power and stop the motor, and means operable by the operator during propeller operation for altering the point in blade pitch adjustment at which the blade pitch responsive element will actuate the control valve into motor stopping position.

18. In a variable pitch propeller having blades mounted for pitch adjustment, in combination, means comprising a motor for altering the pitch of the blades, a source of power for the motor, control means for the motor, a speed responsive governor operatively associated with the latter for normally altering the blade pitch in response to variations in propeller speed, said control means to include means comprising a power cutout element mounted for automatic actuation, when the blades reach a predetermined pitch angle, means comprising a blade pitch responsive element for actuating said cutout element to render the motor and governor ineffective to move the blades beyond said predetermined pitch angle, and means operable by the operator as the propeller operates for changing the blade pitch angle at which said power cutout element will be actuated, whereby the blade pitch can be limited to a predetermined value.

19. In a speed responsive, governor controlled, variable pitch propeller mounted for rotation about its axis and having blades mounted for pitch adjustment, a governor mechanism for altering the blade pitch in accordance with propeller speed, means comprising in a motor for altering the blade pitch, a variable blade pitch limiting mechanism, comprising a motor control mechanism including a positive motor cutout element operatively associated therewith, a blade pitch responsive element mounted for movement commensurate with blade pitch adjustment, said element being operatively connected with the propeller blades and mounted for concentric, longitudinal movement with respect to the axis about which the propeller turns, in spaced relation to said motor cutout element in a manner to obtain lost motion between said motor cutout and pitch responsive elements, means comprising an adjustable element positioned between said last mentioned elements and mounted for adjustment with respect thereto for altering the extent of lost motion between said elements, means operable by the operator as the propeller operates for presetting and holding the adjustable element in adjusted position for altering the point in blade pitch adjustment at which the mechanism will automatically cause the pitch responsive element to actuate the motor cutout element into motor stopping position regardless of the action of the speed responsive governor.

20. A variable pitch propeller in accordance with claim 19, in which means comprising a non-reversible motion transmission mechanism, is interposed between the adjustable blade pitch limiting element and the means operable by the operator.

21. A variable pitch propeller in accordance with claim 19, in which means is interposed between the adjustable element and the means operable by the operator comprising, a motion transmission element mounted for concentric, longitudinal movement with respect to the axis about which the propeller turns, for altering the position of the adjustable blade pitch limiting element.

22. In a variable pitch propeller mounted for rotation about its axis and having blades mounted for pitch adjustment, in combination, means comprising a motor for changing the blade pitch, means for controlling the operation of the motor, a speed responsive governor operatively connected with the last mentioned means for controlling the operation thereof, means operatively connected with the propeller blades comprising, an element mounted for concentric, longitudinal movement with respect to the axis about which the propeller turns, for automatically actuating the motor control means against the action of the governor so as to stop the motor when the blade pitch angle has been increased to a predetermined value, and means operable by the operator for changing said predetermined pitch angle limit during propeller operation.

23. In a variable pitch propeller mounted for rotation about its axis and having blades mounted for pitch adjustment, in combination, means comprising a motor for changing the blade pitch, means for controlling the operation of the motor, a speed responsive governor operatively connected with the last mentioned means for controlling the operation thereof, means comprising interconnected relatively movable blade pitch responsive elements mounted concentric with the axis about which the propeller turns and having an operative connection with the propeller blades, for movement commensurate with the pitch thereof, one of said elements being mounted for limited rotation, the other being mounted for limited longitudinal movement with respect to the axis of propeller rotation, for automatically actuating the motor control means against the action of the governor, so as to stop the motor when the blade pitch angles have been increased to a predetermined value, and means operable by the operator for changing said predetermined blade pitch limit during propeller operation.

24. In a variable pitch propeller mounted for rotation about its axis and having blades mounted for pitch adjustment, means for altering the blade pitch in accordance with variations in propeller speed, comprising a speed responsive device rotatable with the propeller about an axis concentric therewith, and operatively associated with movement of the propeller blades, a variable blade pitch limiting mechanism for controlling the operation of the speed responsive device, comprising a blade pitch responsive element mounted for movement commensurate with blade pitch adjustment, an adjustable element positioned in the path of the pitch responsive element and normally spaced therefrom, and means operable by the operator, as the propeller operates, for adjusting and presetting the adjustable element with respect to the pitch responsive element for varying the extent of lost motion between them, for altering the point in blade pitch adjustment when the mechanism will become automatically effective to limit the blade pitch against the action of the speed responsive device.

25. A variable pitch propeller in accordance with claim 22 in which means, comprising a nonreversible motion transmission mechanism is interposed between the adjustable blade pitch limiting element and the means operable by the operator.

26. A variable pitch propeller in accordance with claim 22 in which means is interposed between the adjustable element and the means operable by the operator comprising, a motion transmission element mounted for concentric, longitudinal movement with respect to the axis about which the propeller turns, for altering the position of the adjustable blade pitch limiting element.

27. In a variable pitch propeller mounted for rotation about its axis and having blades mounted for pitch adjustment, in combination, means comprising a motor for altering the blade pitch, a source of power for the motor, means for controlling operation of the motor including a positive power cutout device for automatically stopping the motor when the blades reach a predetermined pitch angle, means comprising a speed responsive device operatively associated with the motor control for normally altering the blade pitch in response to variations in propeller speed, said automatic motor cutout device comprising a motor cutout element and a blade pitch responsive element, the latter being operatively connected with the propeller blades for movement commensurate with blade pitch adjustment, said blade pitch responsive element being in spaced relation to said motor cutout element, for obtaining lost motion between said elements, means comprising an adjustable element for altering the extent of lost motion between the pitch responsive and motor cutout elements, all three last mentioned elements being mounted for rotation with the propeller, and means operable by the operator for presetting and holding the adjustable element in adjusted position as the propeller operates.

28. A variable pitch propeller in accordance with claim 27, in which means is interposed between the adjustable element and the means operable by the operator comprising, a motion transmission element mounted for concentric, longitudinal movement with respect to the axis about which the propeller turns, for altering the position of the adjustable blade pitch limiting element with respect to the pitch responsive and motor cutout elements.

29. In a variable pitch propeller having adjustable blades, in combination, means comprising a hydraulic motor for changing the pitch of the blades, a control valve for starting and stopping the motor, a governor mechanism operatively connected with the propeller and with the control valve for stopping and starting the motor in response to propeller speed, means for automatically actuating the control valve against the action of the governor when the pitch angle of the blades have been increased to their predetermined limit so as to stop the motor, manually operable means for adjusting the operative characteristics of the governor, separate manually operable means, independent of the manual governor adjusting means, for changing said pitch limit during propeller operation, said separate manually operable independent means also being adapted for actuating the control valve in opposition to the action of the governor, and means for holding the valve in adjusted position against the action of the governor irrespective of governor speed.

30. A variable pitch propeller in accordance with claim 10 in which a separate manual operable means is provided for changing the sensitiveness of the governor whereby the relation between pitch and propeller speed can be altered.

DANIEL G. LILLEY.